США009288385B2

(12) United States Patent
Yu et al.

(10) Patent No.: US 9,288,385 B2
(45) Date of Patent: Mar. 15, 2016

(54) IMAGE SHARING SYSTEM AND RELATED COMPUTER PROGRAM PRODUCT

(71) Applicant: Realtek Semiconductor Corp., Hsinchu (TW)

(72) Inventors: Siu-Leong Yu, Hsinchu County (TW); Sun Chien Chiu, Hsinchu (TW); Shih-Chun Wei, Hsinchu (TW); Chen Ma, San Jose, CA (US)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/503,993

(22) Filed: Oct. 1, 2014

(65) Prior Publication Data

US 2015/0092067 A1 Apr. 2, 2015

Related U.S. Application Data

(60) Provisional application No. 61/885,521, filed on Oct. 2, 2013.

(30) Foreign Application Priority Data

Jan. 29, 2014 (TW) .............................. 103103344 A

(51) Int. Cl.
*H04N 5/225* (2006.01)
*H04N 5/232* (2006.01)
*H04N 1/00* (2006.01)
*G06F 3/0484* (2013.01)

(52) U.S. Cl.
CPC ........ *H04N 5/23216* (2013.01); *G06F 3/04842* (2013.01); *H04N 1/00209* (2013.01); *H04N 1/00244* (2013.01); *H04N 5/23293* (2013.01); *G06F 2203/04802* (2013.01); *H04N 2201/0084* (2013.01)

(58) Field of Classification Search
CPC .................. G06F 2203/04802; G06F 3/04842; H04N 1/00209; H04N 2201/0084; H04N 5/23216; H04N 5/23293; H05N 1/00244
See application file for complete search history.

(56) References Cited

U.S. PATENT DOCUMENTS

| 8,984,445 | B1 * | 3/2015 | Bailiang | 715/846 |
| 9,099,154 | B2 * | 8/2015 | Mutsuro et al. | 1/1 |
| 2004/0064338 | A1 * | 4/2004 | Shiota et al. | 705/1 |
| 2008/0045138 | A1 * | 2/2008 | Milic-Frayling et al. | 455/3.04 |
| 2010/0169774 | A1 * | 7/2010 | Oda et al. | 715/702 |
| 2012/0066646 | A1 * | 3/2012 | Purdy et al. | 715/834 |
| 2013/0169831 | A1 * | 7/2013 | Tomi | 348/207.2 |
| 2014/0317511 | A1 * | 10/2014 | Bailiang et al. | 715/730 |
| 2015/0123999 | A1 * | 5/2015 | Ofstad et al. | 345/637 |

* cited by examiner

*Primary Examiner* — Amy Hsu
(74) *Attorney, Agent, or Firm* — Birch, Stewart, Kolasch & Birch, LLP

(57) ABSTRACT

A computer program product includes: a receiving module for utilizing a communication circuit to receive a photographing positions distribution information; an option object generating module for utilizing a control circuit to generate multiple option objects; an arranging module for utilizing the control circuit to generate a graphic user interface including the multiple option objects and one or more reference indicators according to the photographing positions distribution information; and a displaying control module for utilizing a display device to display the graphic user interface. When the display device displays the graphic user interface, if an input device receives a shift command inputted by a user, the display controlling module controls the display device to move at least a portion of the option objects on the graphic user interface toward a same side and to change position or content of at least one reference indicator.

38 Claims, 18 Drawing Sheets

IMAGE SHARING SYSTEM AND RELATED COMPUTER PROGRAM PRODUCT

CROSS-REFERENCE TO RELATED APPLICATIONS

This application claims the benefit of priority to U.S. Provisional Application Ser. No. 61/885,521, filed on Oct. 2, 2013; the entirety of which is incorporated herein by reference for all purposes.

This application claims the benefit of priority to Patent Application No. 103103344, filed in Taiwan on Jan. 29, 2014; the entirety of which is incorporated herein by reference for all purposes.

BACKGROUND

The disclosure generally relates to an image sharing system and, more particularly, to an image sharing system and related computer program product capable of providing a more intuitive graphic user interface (GUI) for a user to select images thereon.

As the progress of the Internet and multimedia applications, many people often upload a lots of image data to various websites to share with their family, friends, colleagues, or other people, and may also search for images shared by others. Traditional image sharing websites typically categorize numerous image data based on the time of upload, the time of photographing, or the image category defined by the user. In addition, the traditional image sharing websites typically provide the sorted results to the user in the form of an image list.

The image selection basis provided by the traditional image list to the user is typically presented in the form of descriptive texts. In some applications, thumbnails may be attached on the traditional image list as auxiliary data. However, since the selection basis provided by the traditional image list is dull and very restricted in terms of format, it is usually difficult for the user to effectively find image data of interest, thereby causing the user to waste a lot of time on searching image. For example, numerous image data may be uploaded to the image sharing websites after popular activities or events take place. In this situation, the traditional image list is especially incapable of assisting the user to effectively find the image of interest, thereby deteriorating the aforementioned problem and adversely affecting the user satisfaction level of the image sharing websites.

SUMMARY

An example embodiment of an image sharing system is disclosed, comprising an image providing server and an image playback device. The image providing server comprises: a storage device, configured to operably store a site location data and a site orientation data of a target site, multiple image data, and multiple photographing position data respectively corresponding to multiple image data, wherein each of the multiple image data is photographed within a predetermined distance from the target site or contains at least a portion of image content of an event occurred at the target site; a processing circuit, coupled with the storage device, configured to operably calculate a photographing positions distribution information representing a spatial distribution of the multiple photographing position data according to the site location data, the site orientation data, and the multiple photographing position data; and a transmission circuit, coupled with the processing circuit, configured to operably transmit the photographing positions distribution information through Internet after an image enquiry request is received. The image playback device comprises: an input device, configured to operably generate the image enquiry request according to a user's manipulation; a communication circuit, configured to operably transmit the image enquiry request to the transmission circuit of the image providing server through the Internet, and to operably receive the photographing positions distribution information transmitted from the transmission circuit; a control circuit, coupled with the communication circuit and the input device, configured to operably generate multiple option objects respectively corresponding to the multiple image data, and to operably arrange the multiple option objects according to the photographing positions distribution information so as to generate a graphic user interface (GUI) containing the multiple option objects and one or more reference indicators; and a display device, coupled with the control circuit, configured to operably display the GUI. When the display device displays the GUI, if a moving command issued by the user is received by the input device, the control circuit controls the display device to move at least part of the multiple option objects in the GUI toward a same side and to correspondingly change position or content of at least one of the one or more reference indicators, and if an option object selection command corresponding to a target option object in the GUI is received by the input device, the control circuit controls the communication circuit to transmit an image data request corresponding to the target option object to the transmission circuit of the image providing server through the Internet. When the image data request is received by the image providing server, the processing circuit controls the transmission circuit to transmit a target image data out of the multiple image data to the communication circuit through the Internet, and when the target image data is received by the communication circuit, the control circuit controls the display device to display the target image data.

An example embodiment of a computer program product is disclosed. The computer program product is stored in a non-transitory storage device of an image playback device of an image sharing system. When executed by a control circuit of the image playback device, the computer program product enables the image playback device to generate a GUI. The image sharing system comprises an image providing server and the image playback device. The image providing server is configured to operably store a site location data and a site orientation data of a target site, multiple image data, and multiple photographing position data respectively corresponding to the multiple image data, to operably calculate a photographing positions distribution information representing a spatial distribution of the multiple photographing position data according to the site location data, the site orientation data, and the multiple photographing position data, and to operably transmit the photographing positions distribution information through Internet after receiving an image enquiry request transmitted from the image playback device. Each of the multiple image data is photographed within a predetermined distance from the target site or contains at least a portion of image content of an event occurred at the target site. The image playback device comprises a communication circuit, a display device, an input device, and the control circuit. The computer program product comprises: a receiving module, for utilizing the communication circuit to receive the photographing positions distribution information transmitted from the image providing server through the Internet; an option object generating module, for utilizing the control circuit to generate multiple option objects respectively corresponding to the multiple image data; an arranging module, for utilizing the control circuit to arrange the multiple option objects according to the photographing positions distribution information so as to generate a graphic user interface (GUI) containing the multiple option objects and one or more reference indicators; a displaying control module, for utilizing the display device to display the GUI; and a transmitting module. When the display device displays the GUI, if a moving command issued by the user is received by the input device, the displaying control module controls the display device to move at least part of the multiple option objects in the GUI toward a same side and to correspondingly change position or content of at least one of the one or more reference indicators, and if an option object selection command corresponding to a target option object in the GUI is received by the input device, the transmitting module controls the communication circuit to transmit an image data request corresponding to the target option object to the image providing server through the Internet. When the image data request is received by the image providing server, the image providing server transmits a target image data out of the multiple image data to the communication circuit through the Internet, and when the target image data is received by the communication circuit, the control circuit controls the display device to display the target image data.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
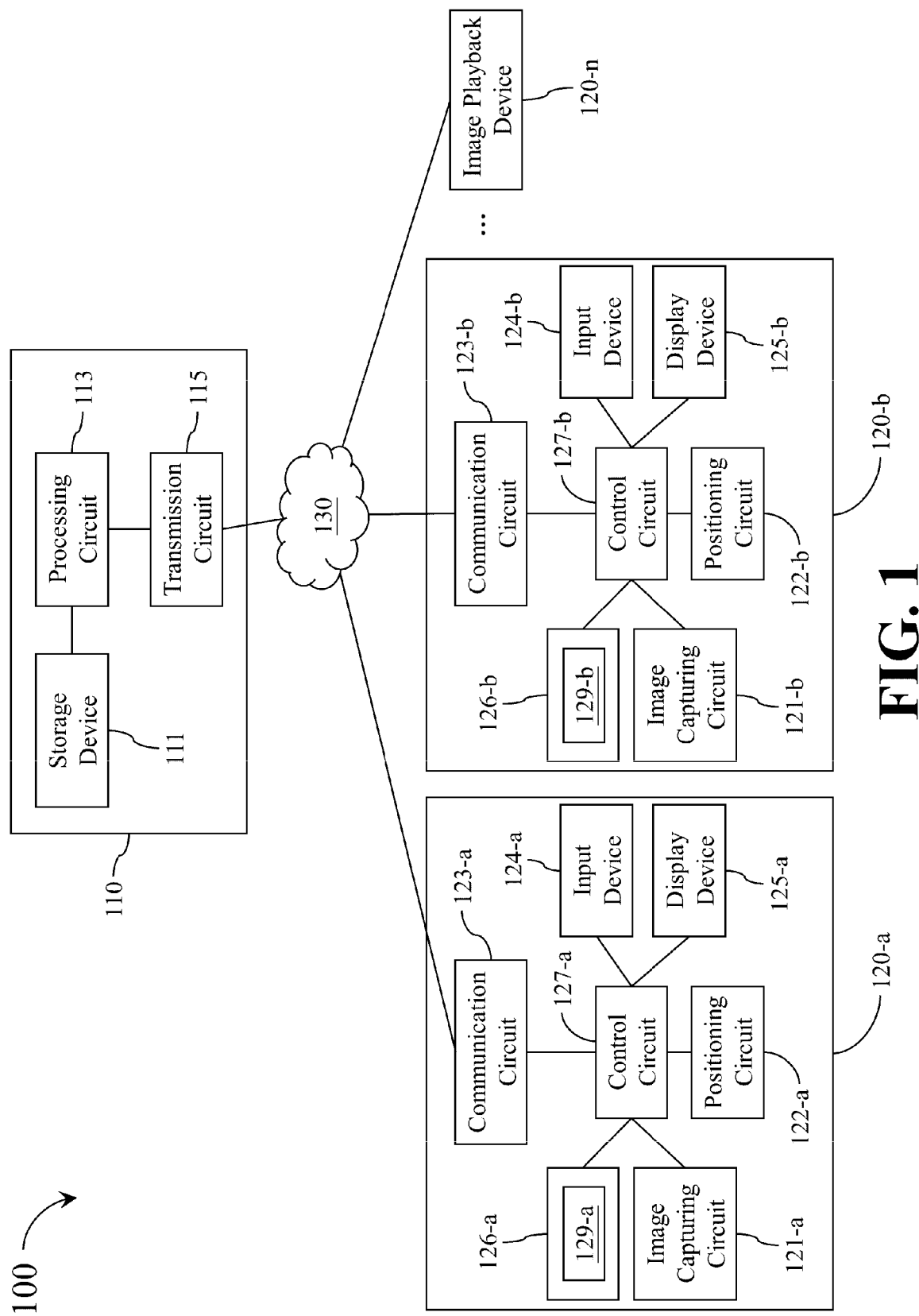
FIG. 1 shows a simplified functional block diagram of an image sharing system according to one embodiment of the present disclosure.

FIG. 1 shows a simplified functional block diagram of an image sharing system 100 according to one embodiment of the present disclosure. The image sharing system 100 comprises an image providing server 110 and multiple image playback devices (e.g., the example image playback devices 120-a~120-n shown in FIG. 1). In the image sharing system 100, the image playback devices 120-a~120-n or other image providing devices (not shown) may transmit image data to the image providing server 110 for storage, and the image providing server 110 may share the stored image data to other devices through the Internet 130 so that the image data can be shared among multiple devices.

In the embodiment of FIG. 1, the image providing server 110 comprises a storage device 111, a processing circuit 113, and a transmission circuit 115. Each of the image playback devices 120 comprises an image capturing circuit 121, a positioning circuit 122, a communication circuit 123, an input device 124, a display device 125, a memory 126, and a control circuit 127. For example, the image playback device 120-a comprises an image capturing circuit 121-a, a positioning circuit 122-a, a communication circuit 123-a, an input device 124-a, a display device 125-a, a memory 126-a, and a control circuit 127-a, while the image playback device 120-b comprises an image capturing circuit 121-b, a positioning circuit 122-b, a communication circuit 123-b, an input device 124-b, a display device 125-b, a memory 126-b, and a control circuit 127-b.

Throughout the specification and drawings, indexes a~n may be used in the reference numbers of components and devices for ease of referring to respective components and devices. The use of indexes a~n does not intend to restrict the amount of components and devices to any specific number. In the specification and drawings, if a reference number of a particular component or device is used without having the index, it means that the reference number is used to refer to any unspecific component or device of corresponding component group or device group. For example, the reference number 120-a is used to refer to the specific image playback device 120-a, and the reference number 120 is used to refer to any unspecific image playback device of the image playback devices 120-a~120-n.

In the image providing server 110, the storage device 111 is configured to operably store site location data and site orientation data of multiple sites. The storage device 111 is configured to operably store image data provided by different image sources, and to operably store multiple photographing position data respectively corresponding to multiple image data.

In addition, the processing circuit 113 is coupled with the storage device 111 and configured to operably calculate a photographing positions distribution information representing a spatial distribution of the multiple photographing position data according to multiple photographing position data corresponding to multiple image data related to a specific site and both the site location data and the site orientation data of the specific site. The transmission circuit 115 is coupled with the processing circuit 113 and configured to operably transmit the photographing positions distribution information to the image playback device 120 through the Internet 130 after receiving an image enquiry request related to the specific site and transmitted from the image playback device 120.

In the image playback device 120, the image capturing circuit 121 is configured to operably generate image data by photographing still or dynamic images based on the user's manipulations. The positioning circuit 122 is configured to operably generate photographing position data corresponding to the image data generated by the image capturing circuit 121. The communication circuit 123 is configured to operably communicate data with the image providing server 110 through the Internet 130. The input device 124 is configured to operably generate various commands or an image enquiry request related to a specific site according to the user's manipulations. The display device 125 is configured to operably display images. The memory 126 is configured to operably store a graphic user interface (GUI) generating program 129 for controlling the image playback device 120 to generate a GUI, and to operably store other data required for the operations of the image playback device 120. The control circuit 127 is coupled with the image capturing circuit 121, the positioning circuit 122, the communication circuit 123, the input device 124, the display device 125, and the memory 126. The control circuit 127 is configured to operably control the operations of the image capturing circuit 121, the positioning circuit 122, the communication circuit 123, the input device 124, and the display device 125.

For example, the control circuit 127 may control the communication circuit 123 to transmit the aforementioned image data and image enquiry request to the image providing server 110 through the Internet 130. Then, the communication circuit 123 may receive the photographing positions distribution information corresponding to the image enquiry request from the image providing server 110 through the Internet 130.

The control circuit 127 may execute the GUI generating program 129 stored in the memory 126 to generate multiple option objects respectively corresponding to the multiple image data stored in the image providing server 110, and to arrange the multiple option objects according to the photographing positions distribution information so as to generate a GUI containing the multiple option objects and one or more reference indicators. The control circuit 127 may control the display device 125 to display the GUI for the user to manipulate.

The aforementioned image capturing circuit 121 may be realized with a camera, a video recorder, or any other image sensing circuits. The aforementioned positioning circuit 122 may be realized with a GPS (Global Positioning System) receiving circuit, a BDS (BeiDou Navigation Satellite System) receiving circuit, an AGPS (Assisted GPS) receiving circuit, an indoor GPS receiving circuit, a WPS (WiFi positioning system) receiving circuit, an IPS (indoor positioning system) receiving circuit, other positioning circuit adopting appropriate positioning technology, or a combination of above circuits. Each of the transmission circuit 115 and the communication circuit 123 may be realized with a wired networking circuit, a wireless networking circuit, or a hybrid circuit integrated with the functionalities of the above two circuits. Each of the processing circuit 113 and the control circuit 127 may be realized with one or more processor units. The input device 124 may be realized with a touch screen, a touch pad, a keyboard, a computer mouse, a voice control device, a posture sensing device, other circuit adopting appropriate command generating technologies, or a combination of the aforementioned devices. In addition, the display device 125 may be realized with any display screen or projector, and may be integrated with the input device 124 into a touch screen.

In practice, the image providing server 110 may be realized with a single server, or may be realized with a combination of multiple servers located in the same geographical area or located in different geographical areas. The image playback device 120 may be realized with any device capable of connecting to the Internet and capable of displaying images, such as a computer (e.g., a tablet computer, a notebook computer, or a netbook computer), a TV, an electronic book, a hand-held game console, or a home theater system. For convenience of illustration, other elements in the image providing server 110 and the image playback device 120 and their connection relationship are not shown in FIG. 1.

Figure 2:
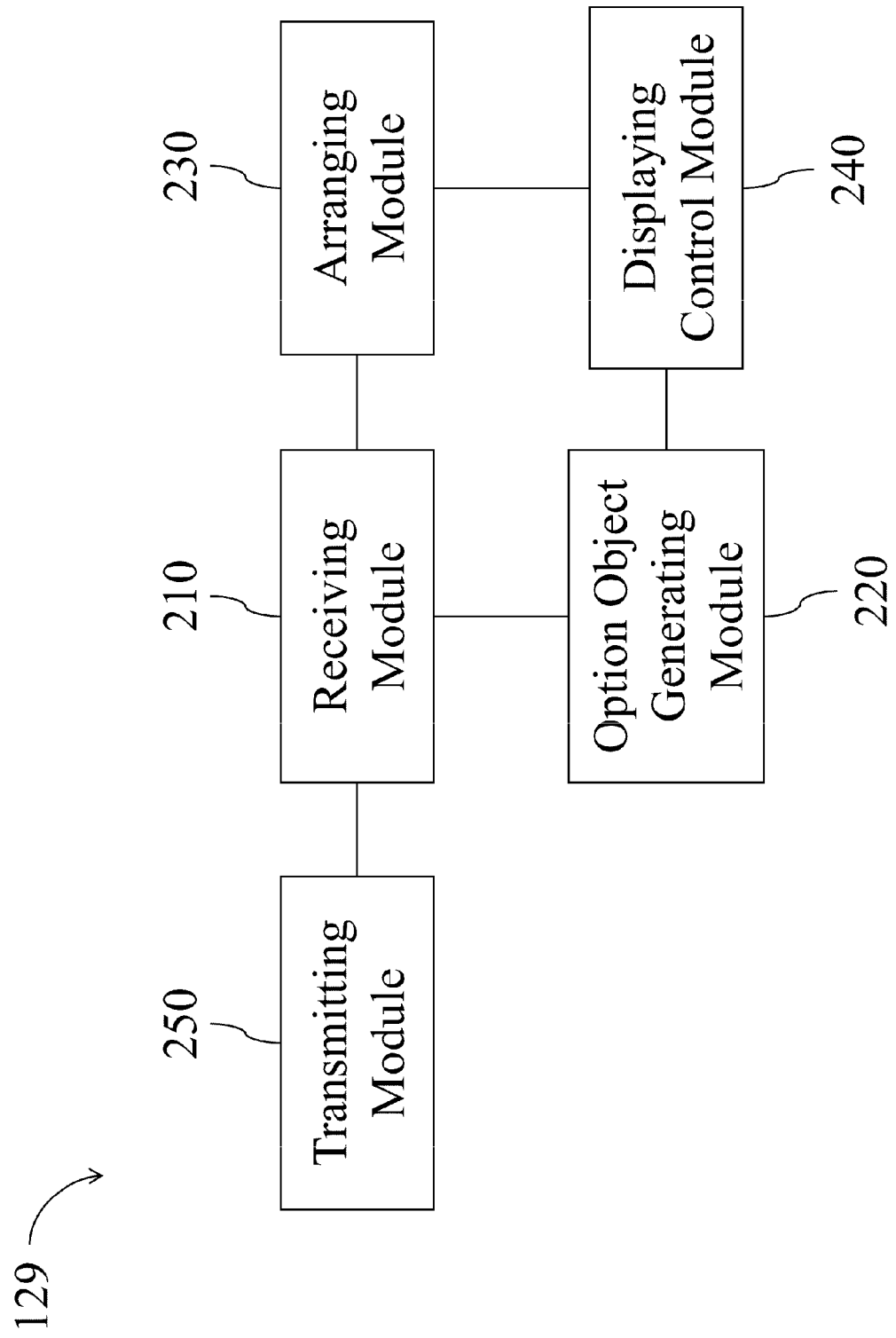
FIG. 2 shows a simplified functional block diagram of a computer program product in an image playback device in FIG. 1 according to one embodiment of the present disclosure.

The GUI generating program 129 in the aforementioned image playback device 120 may be realized with one or more application program modules. For example, FIG. 2 shows a simplified functional block diagram of the GUI generating program 129 in FIG. 1 according to one embodiment of the present disclosure. In this embodiment, the GUI generating program 129 comprises a receiving module 210, an option object generating module 220, an arranging module 230, a displaying control module 240, and a transmitting module 250.

Figure 3:
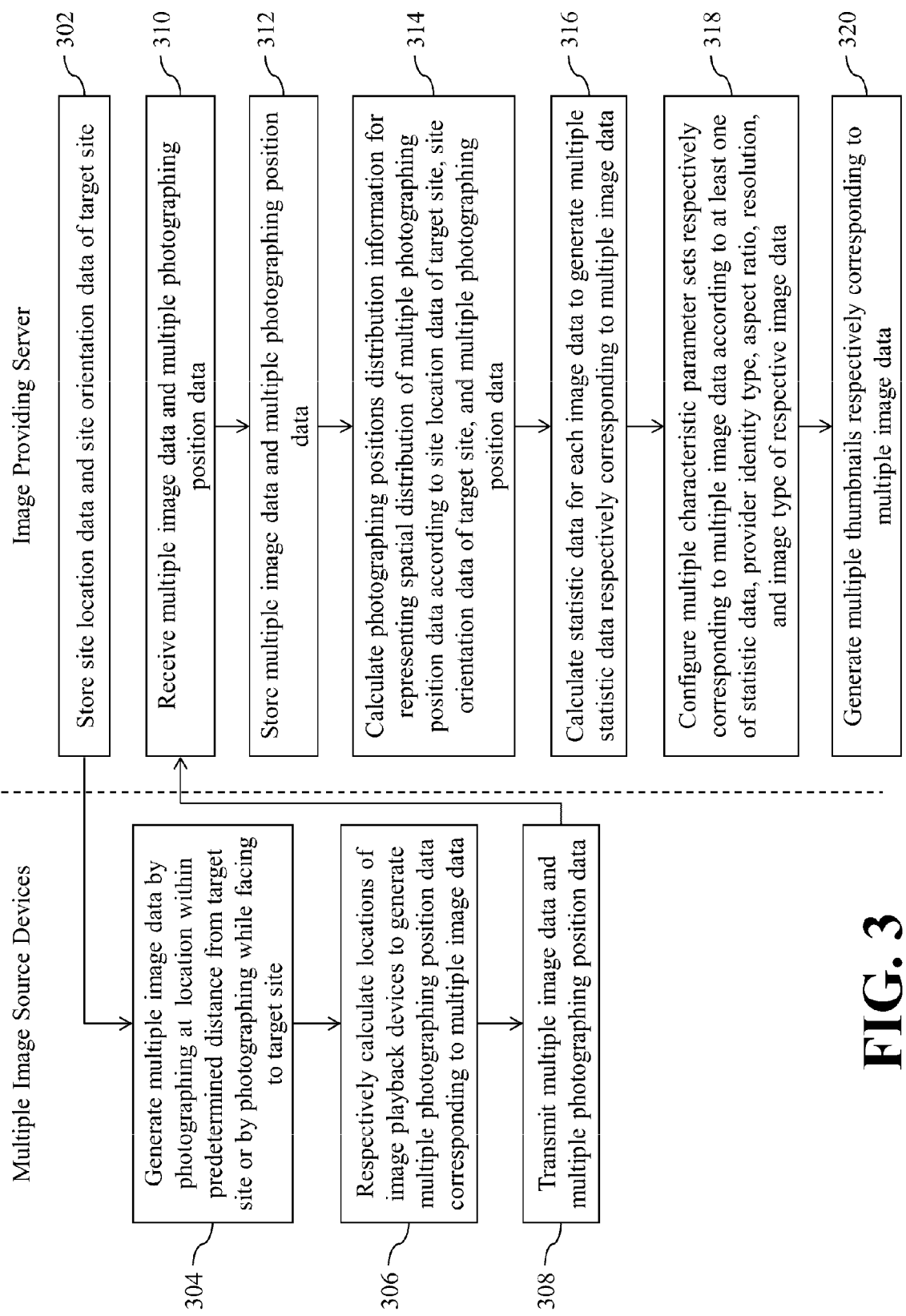
FIG. 3 shows a simplified flowchart of a method for collecting image data and generating photographing positions distribution information according to one embodiment of the present disclosure.
Figure 4:
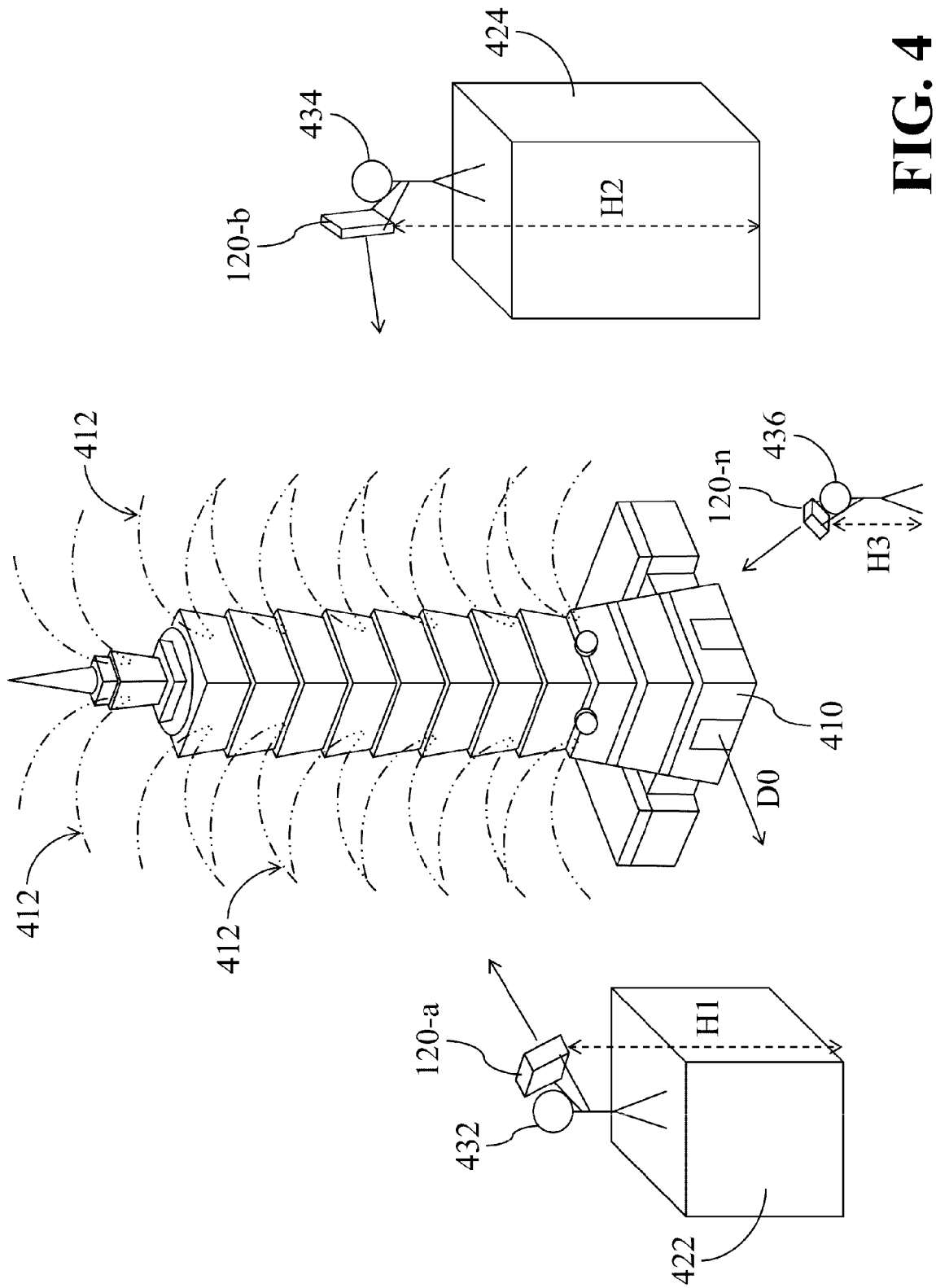
FIG. 4 shows a simplified schematic diagram of a target site and locations of multiple image source devices according to one embodiment of the present disclosure.
Figure 5:
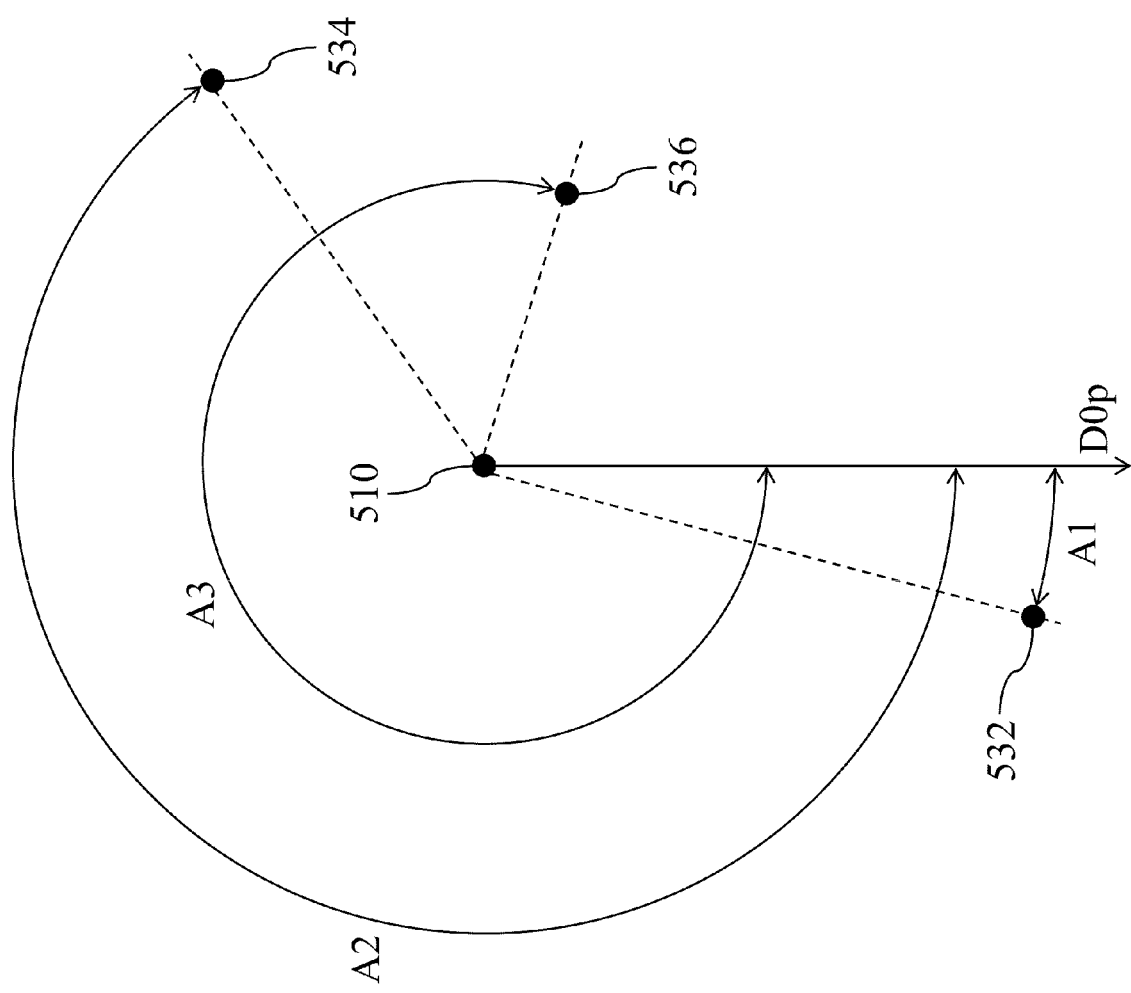
FIG. 5 shows a simplified top view of the target site and the locations of the multiple image source devices in FIG. 4 according to one embodiment of the present disclosure.
Figure 6:
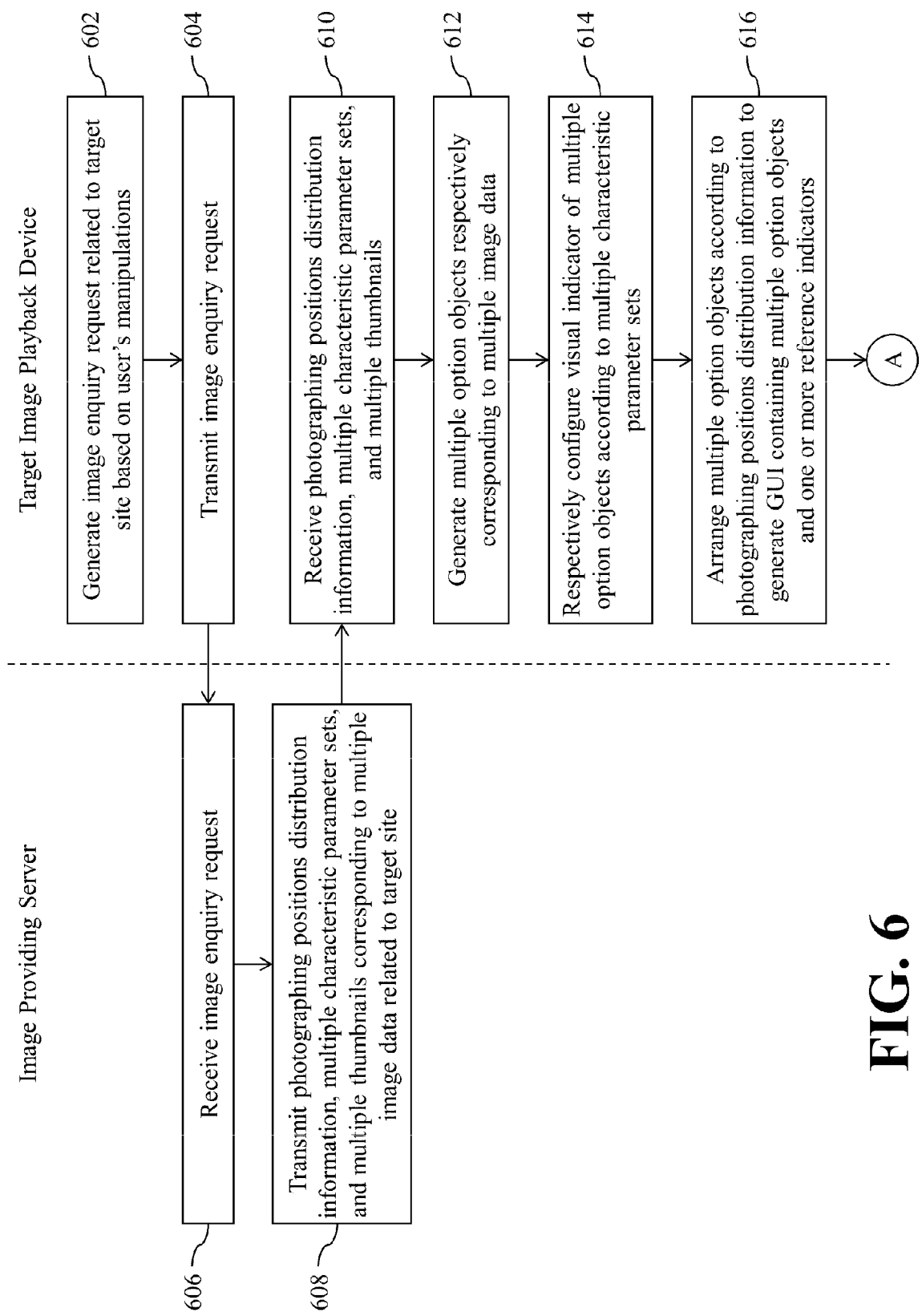
FIGS. 6-7 collectively show a simplified flowchart of a method for generating a graphic user interface (GUI) according to one embodiment of the present disclosure.
Figure 7:
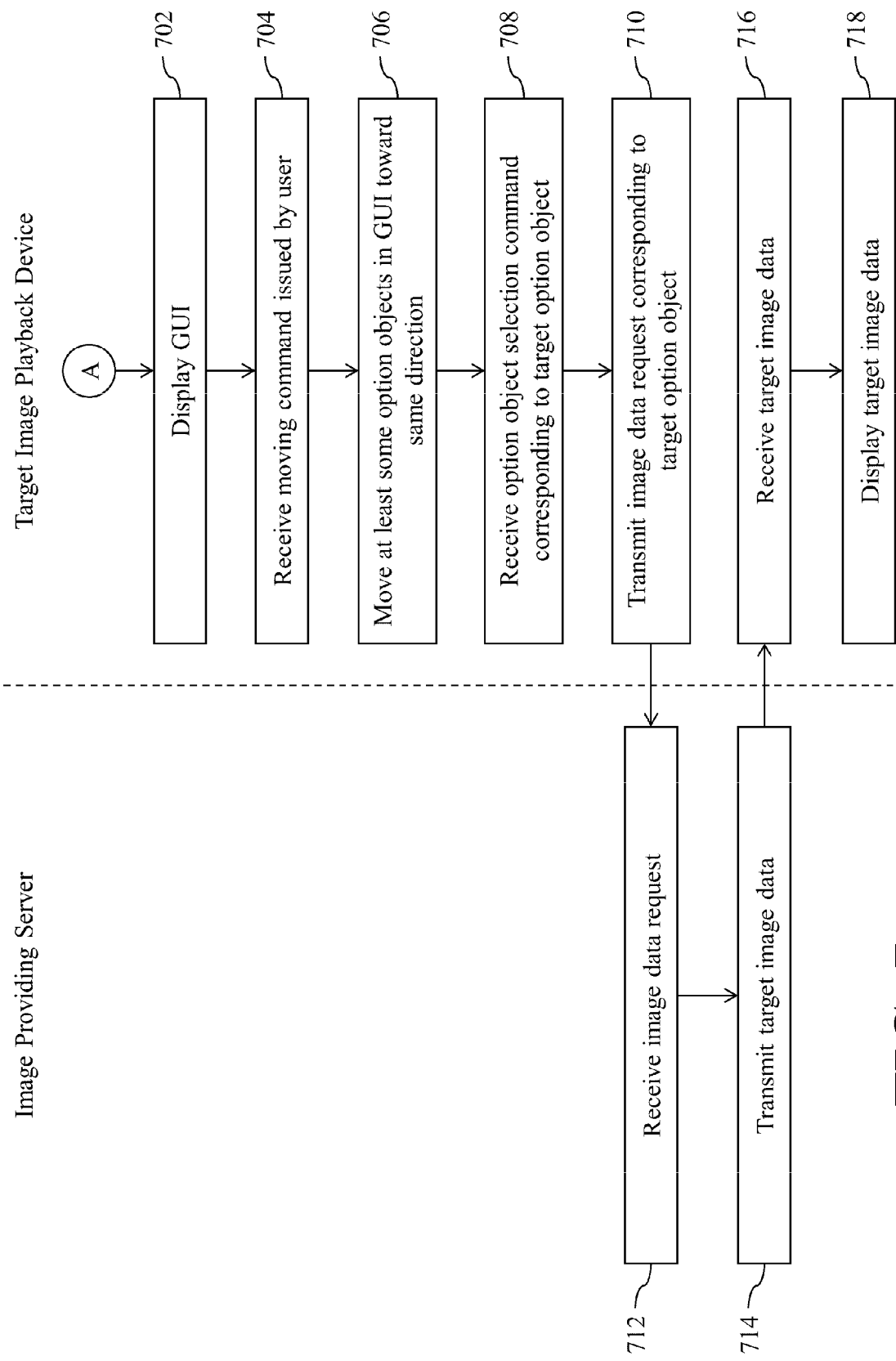

The operations of the image sharing system 100 will be further described in the following by reference to FIG. 3 through FIG. 14. FIG. 3 shows a simplified flowchart of a method for collecting image data and generating photographing positions distribution information according to one embodiment of the present disclosure. FIG. 4 shows a simplified schematic diagram of a target site 410 and locations of multiple image source devices according to one embodiment of the present disclosure. FIG. 5 shows a simplified top view of the target site 410 and the locations of the multiple image source devices in FIG. 4 according to one embodiment of the present disclosure. FIGS. 6-7 collectively show a simplified flowchart of a method for generating a graphic user interface (GUI) according to one embodiment of the present disclosure. FIGS. 8-14 show simplified schematic diagrams of graphic user interfaces according to different embodiments of the present disclosure.

In the flowcharts shown in FIGS. 3, 6, and 7, operations within a column under the name of a specific device are operations to be performed by the specific device. For example, operations within a column under the label "image providing server" are operations to be performed by the image providing server 110, operations within a column under the label "multiple image source devices" are operations to be performed by multiple different image source devices, operations within a column under the label "target image playback device" are operations to be performed by one of the image playback devices 120-*a*~120-*n*.

In the operation 302 of FIG. 3, the processing circuit 113 of the image providing server 110 stores the site location data and site orientation data of multiple sites into the storage device 111.

The term "site location data" used throughout the description and the claims refers to any appropriate data utilized for representing the location of a specific site, such as a 2-D coordinate, a 3-D coordinate, or other location format. The aforementioned specific site may be any recognizable building, building cluster, outdoor place (e.g., a park, a baseball field, or a playground), or indoor place (e.g., a movie theater, an opera, or an indoor stadium). The term "site orientation data" used throughout the description and the claims refers to any appropriate data utilized for representing a direction to which the front door of the specific site points, a direction to which the main exit/entrance of the specific site points, a direction to which the representative structure of the specific site points, a specific reference direction taking the location of the specific site as a basis point and defined by the operator of the image providing server 110, or a specific reference direction calculated by the processing circuit 113 of the image providing server 110 using a predetermined approach. In practice, the aforementioned multiple site location data and site orientation data may be uploaded to the image providing server 110 by different users, may be created by the operator of the image providing server 110, or may be provided by other geographical information vendors.

For illustrative purpose, it is herein assumed that the data stored in the storage device 111 comprise the site location data and the site orientation data of the target site 410 shown in FIG. 4, wherein the site location data is utilized for representing the location of the target site 410, and the site orientation data is defined by the operator of the image providing server 110 and utilized for representing an orientation direction D0 of the target site 410.

As shown in FIG. 3, multiple image source devices perform the operations 304 through 308. In practice, the image source device as mentioned in FIG. 3 may refer to any electronic device having image capturing capability. For illustrative purpose, the operations 304 through 308 will be described below by assuming that the image playback devices 120-*a*, 120-*b*, and 120-*n* are three image source devices in the image sharing system 100.

In the operation 304, the image playback devices 120-*a*, 120-*b*, and 120-*n* generate multiple image data by photographing at a location within a predetermined distance from the target site 410 or by photographing while facing to the target site 410.

The term "image data" as used herein refers to the image data photographed within a predetermined distance (e.g., tens of meters or several kilometers) from the target site 410, or refers to the image data containing at least a portion of image content of a specific event occurred at the target site 410. The image data may be various still picture image or various dynamic video images. For example, as shown in FIG. 4, a firework show is taking place at the target site 410. In FIG. 4, a reference number 412 denotes the firework being launched at the target site 410. In this situation, the image capturing circuit 121-*a* of the image playback device 120-*a* may generate a first image data by photographing still or dynamic images on a building 422 within the predetermined distance from the target site 410 based on a first user 432's manipulations, or by photographing at least a portion of image content of a specific event (e.g., the aforementioned firework show) occurred at the target site 410 based on the first user 432's manipulations. The image capturing circuit 121-*b* of the image playback device 120-*b* may generate a second image data by photographing still or dynamic images on another building 424 within the predetermined distance from the target site 410 based on a second user 434's manipulations, or by photographing at least a portion of image content of the specific event occurred at the target site 410 based on the second user 434's manipulations. The image capturing circuit 121-*n* of the image playback device 120-*n* may generate a third image data by photographing still or dynamic images on a ground position within the predetermined distance from the target site 410 based on a third user 436's manipulations, or by photographing at least a portion of image content of the specific event occurred at the target site 410 based on the third user 436's manipulations.

Please note that each of the first image data, the second image data, and the third image data may be image data generated by the image capturing circuit 121 under the situation where the image capturing circuit 121 always faces to the target site 410 in the entire photographing period. In some embodiments, each of the first image data, the second image data, and the third image data may be image data generated by the image capturing circuit 121 under the situation where the image capturing circuit 121 sometimes faces to the target site 410 while sometimes does not in the entire photographing period. In other embodiments, the second image data, and the third image data may be image data generated by the image capturing circuit 121 under the situation where the image capturing circuit 121 never faces to the target site 410 in the entire photographing period. From another aspect, each of the first image data, the second image data, and the third image data may contain whole image content of the specific event occurred at the target site 410, may contain only a portion of the image content of the specific event, or may contain no piece of the image content of the specific event.

In other words, image data that is photographed within the predetermined distance from the target site 410 but contains no image content of the target site 410 and contains no piece of the image content of the specific event occurred at the target site 410, still complies with the definition of the image data referred in the operation 304.

In the operation 306, the image playback devices 120-*a*, 120-*b*, and 120-*n* respectively calculate their own locations to generate multiple photographing position data corresponding to the multiple image data.

The term "photographing position data" used throughout the description and the claims refers to any appropriate data, such as a 2-D coordinate, a 3-D coordinate, or other location format, utilized for representing the location of a source device of specific image data at the time the source device begins to generate the specific image data, the location of the source device at the time the source device completes the generation of the specific image data, or the location of the source device at any intermediate time during generating the specific image data. For example, the positioning circuit 122-*a* of the image playback device 120-*a* may calculate the location of the image playback device 120-*a* at the time the image capturing circuit 121-*a* begins generating the first image data to generate a first photographing position data corresponding to the first image data. The positioning circuit 122-*b* of the image playback device 120-*b* may calculate the location of the image playback device 120-*b* at the time the image capturing circuit 121-*b* completes the generation of the second image data to generate a second photographing position data corresponding to the second image data. The positioning circuit 122-*n* of the image playback device 120-*n* may calculate the location of the image playback device 120-*n* at any intermediate time (e.g., the middle time) during the image capturing circuit 121-*n* generates the third image data to generate a third photographing position data corresponding to the third image data.

In the operation 308, the image playback devices 120-*a*, 120-*b*, and 120-*n* transmit the aforementioned multiple image data and multiple photographing position data to the image providing server 110. For example, the communication circuit 123-*a* of the image playback device 120-*a* may transmit the first image data and corresponding first photographing position data to the image providing server 110 through the Internet 130. The communication circuit 123-*b* of the image playback device 120-*b* may transmit the second image data and corresponding second photographing position data to the image providing server 110 through the Internet 130. The communication circuit 123-*n* of the image playback device 120-*n* may transmit the third image data and corresponding third photographing position data to the image providing server 110 through the Internet 130.

Please note that in operations, the image playback devices 120-*a*, 120-*b*, and 120-*n* or other image source devices may, but not limited to, simultaneously perform each of the operations 304~308.

In the operation 310, the transmission circuit 115 of the image providing server 110 may receive multiple image data including the aforementioned first image data, second image data, and third image data, as well as receive multiple photographing position data including the aforementioned first photographing position data, second photographing position data, and third photographing position data, from the image playback devices 120-*a*, 120-*b*, and 120-*n* and other image data sources. In practice, some image data in the multiple image data and some photographing position data in the multiple photographing position data may be created by the operator of the image providing server 110.

In the operation 312, the processing circuit 113 of the image providing server 110 may store the multiple image data and the multiple photographing position data received by the transmission circuit 115 into the storage device 111.

In the operation 314, the processing circuit 113 may calculate photographing positions distribution information for representing a spatial distribution of the multiple photographing position data according to the site location data of the target site 410, the site orientation data of the target site 410, and the multiple photographing position data related to the target site 410. The processing circuit 113 may also store the photographing positions distribution information into the storage device 111.

In one embodiment, the aforementioned photographing positions distribution information may contain multiple photographing altitudes and multiple photographing azimuths respectively corresponding to the multiple photographing position data. In this embodiment, the processing circuit 113 may derive the multiple photographing altitudes from the multiple photographing position data, and may calculate the multiple photographing azimuths according to the multiple photographing position data and both the site location data and the site orientation data of the target site 410.

For example, in the embodiment of FIG. 4, the height of the location where the image playback device 120-a currently resides is H1, the height of the location where the image playback device 120-b currently resides is H2, and the height of the location where the image playback device 120-n currently resides is H3. The processing circuit 113 may derive the aforementioned first photographing position data, second photographing position data, and third photographing position data from the multiple photographing position data. In the aforementioned embodiment where each of the first photographing position data, the second photographing position data, and the third photographing position data is realized with a 3-D coordinate or other coordinate format containing the height information, the processing circuit 113 may directly derive a first photographing altitude corresponding to the height H1 from the first photographing position data, derive a second photographing altitude corresponding to the height H2 from the second photographing position data, and derive a third photographing altitude corresponding to the height H3 from the third photographing position data. In practice, the processing circuit 113 may simply respectively utilize the aforementioned heights H1, H2, and H3 to be the first photographing altitude, the second photographing altitude, and the third photographing altitude. In some embodiments, the processing circuit 113 may standardize the aforementioned heights H1, H2, and H3 to generate the first photographing altitude, the second photographing altitude, and the third photographing altitude, or may apply a predetermined fixed ratio to the aforementioned heights H1, H2, and H3 to generate the first photographing altitude, the second photographing altitude, and the third photographing altitude.

As described previously, FIG. 5 shows a simplified top view of the target site 410 and the locations of the multiple image source devices (e.g., the image playback devices 120-a, 120-b, and 120-n in this embodiment) in FIG. 4 according to one embodiment of the present disclosure. In FIG. 5, a reference number 510 denotes the position of the target site 410 (hereinafter, the target position), a reference number 532 denotes the device position of the image playback device 120-a, a reference number 534 denotes the device position of the image playback device 120-b, and a reference number 536 denotes the device position of the image playback device 120-n. The processing circuit 113 may derive the target position 510 from the site location data of the target site 410. The processing circuit 113 may derive the site orientation direction D0 of the target site 410 from the site orientation data of the target site 410. The processing circuit 113 may derive the device position 532 of the image playback device 120-a from the first photographing position data, derive the device position 532 of the image playback device 120-b from the second photographing position data, and derive the device position 536 of the image playback device 120-n from the third photographing position data.

The processing circuit 113 may configure the target position 510 as a basis point, configure a vertical plane on which the site orientation direction D0 of the target site 410 resides as a basis plane, and respectively calculate three horizontal angles A1, A2, and A3 that the device positions 532, 534, and 536 rotate clockwise from the basis plane. In this embodiment, the processing circuit 113 may configure the horizontal angle A1 as a first photographing azimuth corresponding to the first photographing position data, configure the horizontal angle A2 as a second photographing azimuth corresponding to the second photographing position data, and configure the horizontal angle A3 as a third photographing azimuth corresponding to the third photographing position data.

Accordingly, the first photographing altitude, the second photographing altitude, the third photographing altitude, the first photographing azimuth, the second photographing azimuth, and the third photographing azimuth contained in the photographing positions distribution information of this embodiment may be utilized for representing a spatial distribution of the first photographing position data, the second photographing position data, and the third photographing position data.

In another embodiment, the aforementioned photographing positions distribution information may contain multiple vertical positions and multiple horizontal positions (e.g., multiple X coordinates and multiple Y coordinates) respectively corresponding to the multiple photographing position data. In this embodiment, the processing circuit 113 may derive the multiple vertical positions from the multiple photographing position data, and may calculate the multiple horizontal positions according to the multiple photographing position data and both the site location data and the site orientation data of the target site 410.

For example, the processing circuit 113 may convert the first photographing altitude into a first vertical position, convert the second photographing altitude into a second vertical position, and convert the third photographing altitude into a third vertical position. Alternatively, the processing circuit 113 may simply utilize the first photographing altitude, the second photographing altitude, and the third photographing altitude to be a first vertical position, a second vertical position, and a third vertical position. In addition, the processing circuit 113 may convert the horizontal angle A1 into a first horizontal position, convert the horizontal angle A2 into a second horizontal position, and convert the horizontal angle A3 into a third horizontal position.

Accordingly, the first vertical position, the second vertical position, the third vertical position, the first horizontal position, the second horizontal position, and the third horizontal position contained in the photographing positions distribution information of this embodiment may be utilized for representing a spatial distribution of the first photographing position data, the second photographing position data, and the third photographing position data.

In the operation 316, the processing circuit 113 may calculate a statistic data for each image data so as to generate multiple statistic data respectively corresponding to the multiple image data. The processing circuit 113 may also store the multiple statistic data into the storage device 111. In practice, the aforementioned multiple statistic data may be multiple ranking scores respectively corresponding to the multiple image data. For example, each statistic data may be a sum of the ranking scores or an average ranking score of the same image data made by different users. For example, the processing circuit 113 may collect a total number of endorsements, likes, or positive feedbacks of a specific image data from different users, and may utilize the collected number as the statistical data of the specific image data.

Alternatively, the aforementioned multiple statistical data may be multiple annotation counts respectively corresponding to the multiple image data. For example, each statistical data may be a total quantity of annotations (hereinafter, an annotation count) provided by the same user or by different users to the same image data. The aforementioned annotations may be presented in the format of plain texts or various kinds of multimedia. For example, the user may produce a multimedia file about his experiences, feelings, or supplementary comments for a specific image data, and may upload the multimedia file to the image providing server 110 to be an annotation for the specific image data.

In the operation 318, the processing circuit 113 may configure multiple characteristic parameter sets respectively corresponding to the multiple image data according to at least one of the statistic data, the provider identity type, the aspect ratio, the resolution, and the image type of respective image data, and may store the multiple characteristic parameter sets into the storage device 111. Each set of the aforementioned characteristic parameters comprises one or more characteristic parameters.

The term "characteristic parameter" used throughout the description and the claims refers to any appropriate parameter utilized for instructing the image playback device 120 to configure a visual indicator of an option object corresponding to a specific image data. The term "visual indicator" used throughout the description and the claims refers to any visually perceivable non-text feature of the option object, such as a size of the option object, a color of the option object, a shape of the option object, an outer frame color of the option object, and/or an outer frame thickness of the option object. For example, the processing circuit 113 may configure a set of characteristic parameters (hereinafter, a target characteristic parameter set) for a target image data in the multiple image data according to at least one of a statistic data, a provider identity type, an aspect ratio, a resolution, and/or an image type of the target image data. The functionalities of the visual indicator will be further described accompanying with the operations of the image playback device 120 in the following.

In the operation 320, the processing circuit 113 may generate multiple thumbnails respectively corresponding to the multiple image data, and store the multiple thumbnails into the storage device 111.

Afterwards, when the user utilizes the image playback device 120 to search the image providing server 110 for image data related to the target site 410, the image sharing system 100 performs the GUI generating method illustrated in FIG. 6 and FIG. 7.

When performing the GUI generating method illustrated in FIG. 6 and FIG. 7, the control circuit 127 of the image playback device 120 executes the GUI generating program 129 stored in the memory 126 to enable the image playback device 120 to perform a GUI generating operation formed by all or part of the operations within the corresponding column.

For illustrative purpose, the operations in FIG. 6 and FIG. 7 will be further elaborated hereinafter by taking the image playback device 120-a as an example.

When the first user 432 of the image playback device 120-a wants to search the image providing server 110 for image data related to the target site 410, the first user 432 may issue commands through the input device 124-a of the image playback device 120-a. In this situation, the input device 124-a performs the operation 602 in FIG. 6 to generate an image enquiry request related to the target site 410 based on the first user 432's manipulations.

In the operation 604, the control circuit 127-a controls the communication circuit 123-a to transmit the image enquiry request to the image providing server 110 through the Internet 130 so as to request the image providing server 110 to provide searching results of image data related to the target site 410.

In the operation 606, the transmission circuit 115 of the image providing server 110 receives the image enquiry request transmitted from the communication circuit 123-a.

In the operation 608, the processing circuit 113 utilizes the transmission circuit 115 to transmit the photographing positions distribution information, the multiple characteristic parameter sets, and the multiple thumbnails corresponding to the multiple image data related to the target site 410 to the communication circuit 123-a through the Internet 130 according to the image enquiry request. As described previously, each of the so-called multiple image data related to the target site 410 referred in the operation 608 is an image data photographed within a predetermined distance from the target site 410 or is an image data containing at least a portion of image content of a specific event (e.g., the aforementioned firework show) occurred at the target site 410.

In the operation 610, the receiving module 210 of the GUI generating program 129-a in the image playback device 120-a utilizes the communication circuit 123-a to receive the photographing positions distribution information, the multiple characteristic parameter sets, and the multiple thumbnails transmitted from the image providing server 110 through the Internet 130.

In the operation 612, the option object generating module 220 of the GUI generating program 129-a utilizes the control circuit 127-a to generate multiple option objects respectively corresponding to the multiple image data.

In the operation 614, the option object generating module 220 of the GUI generating program 129-a utilizes the control circuit 127-a to respectively configure the visual indicators of the multiple option objects according to the multiple characteristic parameter sets. As described previously, the visual indicator of a specific option object refers to any visually perceivable non-text feature of the specific option object, such as a size of the specific option object, a color of the specific option object, a shape of the specific option object, an outer frame color of the specific option object, and/or an outer frame thickness of the specific option object. Therefore, the option object generating module 220 may utilize the control circuit 127-a to configure the size, color, shape, outer frame color, outer frame thickness, and/or other visually perceivable non-text features for each of the multiple option objects according to a corresponding parameter set of the multiple characteristic parameter sets.

In the operation 616, the arranging module 230 of the GUI generating program 129-a utilizes the control circuit 127-a to arrange the multiple option objects according to the photographing positions distribution information to generate a GUI containing the multiple option objects and one or more reference indicators.

Then, the displaying control module 240 of the GUI generating program 129-*a* performs the operation 702 in FIG. 7 to utilize the display device 125-*a* to display the GUI.

Figure 8:
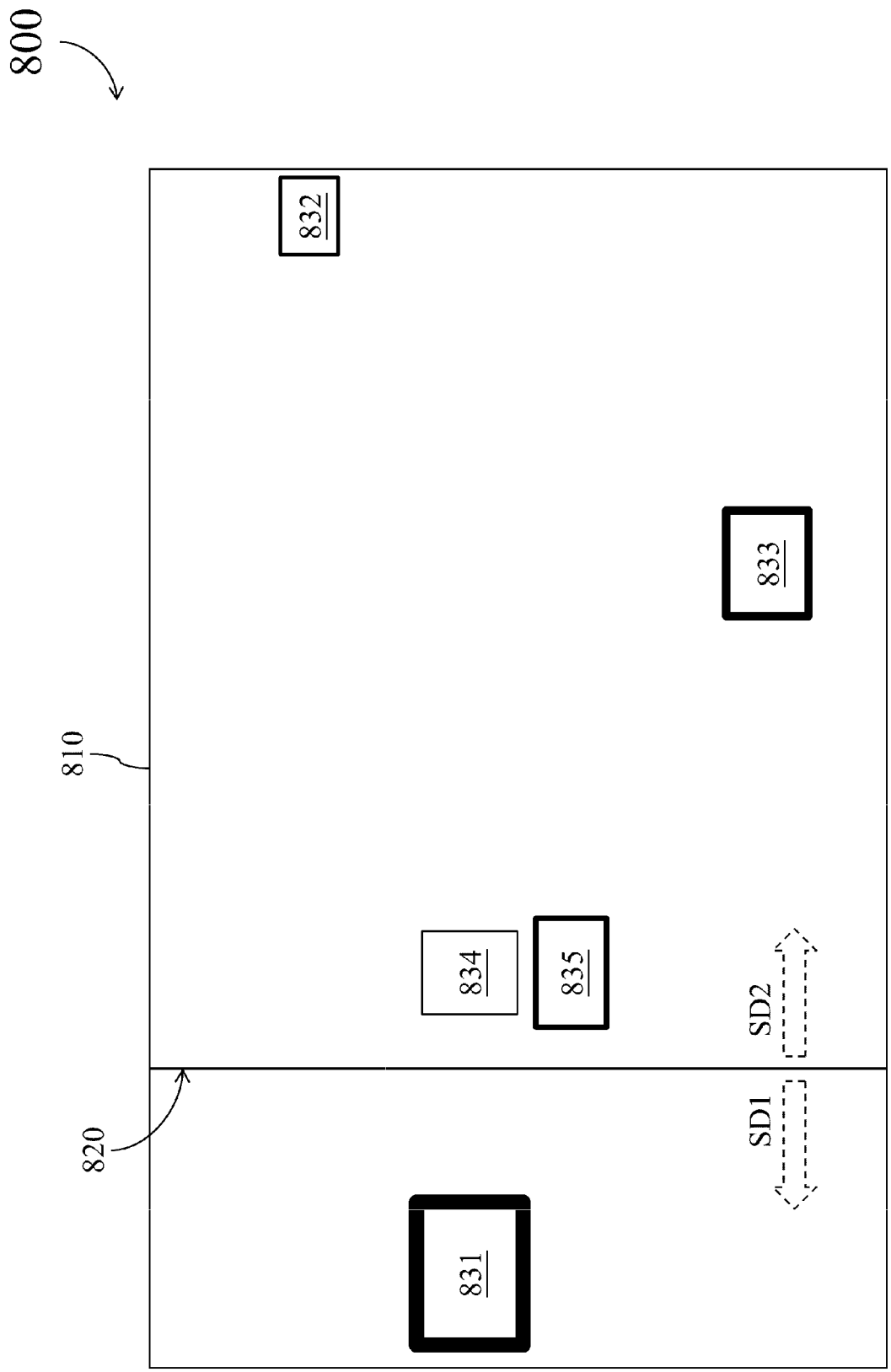
FIGS. 8-18 show simplified schematic diagrams of graphic user interfaces according to different embodiments of the present disclosure.

For example, FIG. 8 shows a simplified schematic diagram of a GUI 800 according to one embodiment of the present disclosure. The GUI 800 comprises a rectangular area 810, a reference indicator 820, and multiple option objects (e.g., the example option objects 831~835 shown in FIG. 8).

In the aforementioned operation 612, the option object generating module 220 may utilize the control circuit 127-*a* to respectively utilize the multiple thumbnails to be main parts of the multiple option objects 831~835, so as to directly show the thumbnails of corresponding image data on the option objects 831~835.

In the aforementioned operation 614, the option object generating module 220 may utilize the control circuit 127-*a* to configure the non-text visual indicators of the option objects 831~835 respectively according to the multiple characteristic parameter sets. In practice, the control circuit 127-*a* may configure the size, color, shape, outer frame color, outer frame thickness, and/or other visually perceivable non-text features of the option object 831 according to a characteristic parameter set of the image data corresponding to the option object 831. As a result, the non-text visual indicators of the option object 831 can be employed to present the statistic data, the provider identity type, the aspect ratio, the resolution, and/or the image type of the image data corresponding to the option object 831.

If the characteristic parameter contains the aspect ratio data of corresponding image data, the control circuit 127-*a* may configure the shape of the option object 831 according to the aspect ratio data, so that the aspect ratio of the shape of the option object 831 matches with the aspect ratio of the shape of corresponding image data.

If the characteristic parameter contains the resolution data of the corresponding image data, the control circuit 127-*a* may configure the size of the option object 831 according to the resolution data, so that the size of the option object 831 is proportional to the resolution of the image data.

If the characteristic parameter contains the image type data of the corresponding image data, the control circuit 127-*a* may configure the color of the option object 831 according to the image type data. For example, if the image data corresponding to the option object 831 is a still picture image, the control circuit 127-*a* may configure the color of the option object 831 to be a cool color, such as blue or green. If the image data corresponding to the option object 831 is a dynamic video image, the control circuit 127-*a* may configure the color of the option object 831 to be a warm color, such as red or orange.

If the characteristic parameter contains the provider identity type data of the corresponding image data, the control circuit 127-*a* may configure the outer frame color of the option object 831 according to the provider identity type data. For example, if the provider of the image data corresponding to the option object 831 is a normal user, the control circuit 127-*a* may configure the outer frame color of the option object 831 to be gray or other relatively less notable color. If the provider of the image data corresponding to the option object 831 is a high-level user, the control circuit 127-*a* may configure the outer frame color of the option object 831 to be yellow or other relatively notable color. If the provider of the image data corresponding to the option object 831 is the image providing server 110 or other vendor, the control circuit 127-*a* may configure the outer frame color of the option object 831 to be purple or other highly notable color.

If the characteristic parameter contains the statistic data of the corresponding image data, the control circuit 127-*a* may configure the outer frame thickness of the option object 831 according to the statistic data, so that the outer frame thickness of the option object 831 has a correlation relationship with the quantity of the statistic data of the corresponding image data. For example, if the statistic data of the image data corresponding to the option object 831 has a relatively greater value, the control circuit 127-*a* may increase the outer frame thickness of the option object 831, and if the statistic data of the image data corresponding to the option object 831 has a relatively smaller value, the control circuit 127-*a* may decrease the outer frame thickness of the option object 831.

Please note that the foregoing configurations of visual indicator are some embodiments, rather than restrictions to the practical implementations. For example, the control circuit 127-*a* may configure the size, color, outer frame color, or outer frame thickness of the option object 831 according to the aspect ratio data of the corresponding image data, so that the size, color, outer frame color, or outer frame thickness of the option object 831 has a predetermined correlation relationship with the aspect ratio data of the corresponding image data.

In another example, the control circuit 127-*a* may configure the shape, color, outer frame color, or outer frame thickness of the option object 831 according to the resolution data of the corresponding image data, so that the shape, color, outer frame color, or outer frame thickness of the option object 831 has a predetermined correlation relationship with the resolution data of the corresponding image data.

In another example, the control circuit 127-*a* may configure the size, shape, outer frame color, or outer frame thickness of the option object 831 according to the image type data of the corresponding image data, so that the size, shape, outer frame color, or outer frame thickness of the option object 831 has a predetermined correlation relationship with the image type data of the corresponding image data.

In another example, the control circuit 127-*a* may configure the size, color, shape, or outer frame thickness of the option object 831 according to the provider identity type data of the corresponding image data, so that the size, color, shape, or outer frame thickness of the option object 831 has a predetermined correlation relationship with the provider identity type data of the corresponding image data.

In another example, the control circuit 127-*a* may configure the size, color, shape, or outer frame color of the option object 831 according to the statistic data of the corresponding image data, so that the size, color, shape, or outer frame color of the option object 831 has a predetermined correlation relationship with the statistic data of the corresponding image data.

Similarly, the control circuit 127-*a* may adopt some of the aforementioned configuration approaches in the operation 614 to configure the visual indicators of the other option objects, so that each option object is enabled to present the statistic data, the provider identity type, the aspect ratio, the resolution, and/or the image type of the corresponding image data in the form of above non-text visual delivering manner.

As a result, when the displaying control module 240 utilizes the display device 125-*a* to display the GUI 800, the user is allowed to rapidly recognize the statistic data, the provider identity type, the aspect ratio, the resolution, and/or the image type of the image data corresponding to a specific option object in the GUI 800 from the visual indicator of the specific option object, and then takes the visual indicators of the option objects as important selection basis in selecting image data without wasting time to read other descriptive texts.

In the aforementioned operation 616, the arranging module 230 may utilize the control circuit 127-a to arrange the multiple option objects including the option objects 831~835 according to the photographing positions distribution information provided by the image providing server 110 to generate the GUI 800.

For illustrative purpose, it is assumed hereinafter that the option object 831 corresponds to the aforementioned first image data, the option object 832 corresponds to the aforementioned second image data, and the option object 833 corresponds to the aforementioned third image data. In this situation, it can be appreciated from the foregoing descriptions that the option object 831 corresponds to the aforementioned first photographing azimuth A1 and also corresponds to the aforementioned first photographing altitude (e.g., H1); the option object 832 corresponds to the aforementioned second photographing azimuth A2 and also corresponds to the aforementioned second photographing altitude (e.g., H2); the option object 833 corresponds to the aforementioned third photographing azimuth A3 and also corresponds to the aforementioned third photographing altitude (e.g., H3). In addition, according to the foregoing descriptions regarding FIG. 4 and FIG. 5, it can be appreciated that the first photographing azimuth A1 is less than the second photographing azimuth A2, the second photographing azimuth A2 is less than the third photographing azimuth A3, the third photographing altitude is less than the first photographing altitude, and the first photographing altitude is less than the second photographing altitude.

In this embodiment, the arranging module 230 may arrange the option object 833 to have a horizontal position in the left side of the option object 832, arrange the option object 831 to have a horizontal position in the left side of the option object 833, configure a vertical position of the option object 831 to be higher than a vertical position of the option object 833, and configure a vertical position of the option object 832 to be higher than the vertical position of the option object 831, thereby forming the arrangement as shown in FIG. 8.

In addition to utilize the control circuit 127-a to arrange the multiple option objects according to the photographing positions distribution information, the arranging module 230 further utilizes the control circuit 127-a to arrange a reference indicator 820 in the GUI 800 to indicate a reference direction. In this embodiment, the reference indicator 820 may be utilized for indicating the site orientation direction D0 of the target site 410, and the user is thus allowed to understand the photographing azimuth relationship among the multiple option objects 831~835 in the current image of the GUI 800 and to understand the horizontal position relationship between each option object and the site orientation direction D0 of the target site 410.

As a result, when the displaying control module 240 utilizes the display device 125-a to display the GUI 800, the user is allowed to rapidly recognize the photographing altitude relationship among the image data corresponding to different option objects in the GUI 800 based on the vertical position difference among those option objects. In addition, the user is also enabled to rapidly recognize the photographing azimuth relationship among the image data corresponding to different option objects in the GUI 800 based on the horizontal position difference among those option objects. Therefore, the foregoing approach where the arranging module 230 utilizes the control circuit 127-a to arrange the multiple option objects according to the photographing positions distribution information enables the user to distinguish the photographing altitude differences as well as the photographing azimuth differences among different image data through a very intuitive visual perception. In this way, the user is enabled to take the photographing altitude difference and the photographing azimuth difference among different image data as important selection basis in selecting image data to be playbacked without frequently switching among different video images or wasting time to read other descriptive texts.

In some applications, the displaying control module 240 may not allow to simultaneously display all option objects in the GUI 800 due to the screen size restriction of the display device 125-a. In order to provide more convenient manipulation experience to the user, the displaying control module 240 of the GUI generating program 129-a may change the combination of option objects being displayed in the GUI 800 when the user issues an appropriate command.

For example, if the user wants to check whether there is any option object existing in the left side of the option object 831 within the GUI 800, the user may conduct appropriate manipulations to issue a moving command through the input device 124-a. For example, the user may issue the moving command by sliding a finger on the GUI 800, clicking a specific area of the GUI 800, or dragging the GUI 800 with a computer mouse. In this situation, the receiving module 210 of the GUI generating program 129-a performs the operation 704 to utilize the input device 124-a to receive the moving command.

For illustrative purpose, it is assumed hereinafter that the moving command is utilized for requesting the GUI generating program 129-a to move the contents within the rectangular area 810 of the GUI 800 toward the right side (i.e., toward a direction SS2 in FIG. 8), so that more contents arranged in the left side of the option object 831 can be displayed in the GUI 800. In addition, it is also assumed hereinafter that the option object 834 in the GUI 800 corresponds to a fourth photographing azimuth A4 of the multiple photographing azimuths and also corresponds to a fourth photographing altitude (e.g., H4) of the multiple photographing altitudes; the option object 835 corresponds to a fifth photographing azimuth A5 of the multiple photographing azimuths and also corresponds to a fifth photographing altitude (e.g., H5) of the multiple photographing altitudes. In this embodiment, the fourth photographing azimuth A4 is greater than the aforementioned third photographing azimuth A3, the fifth photographing azimuth A5 is equal to the fourth photographing azimuth A4, the fourth photographing altitude is equal to the aforementioned first photographing altitude, and the fifth photographing altitude is less than the fourth photographing altitude.

Figure 9:
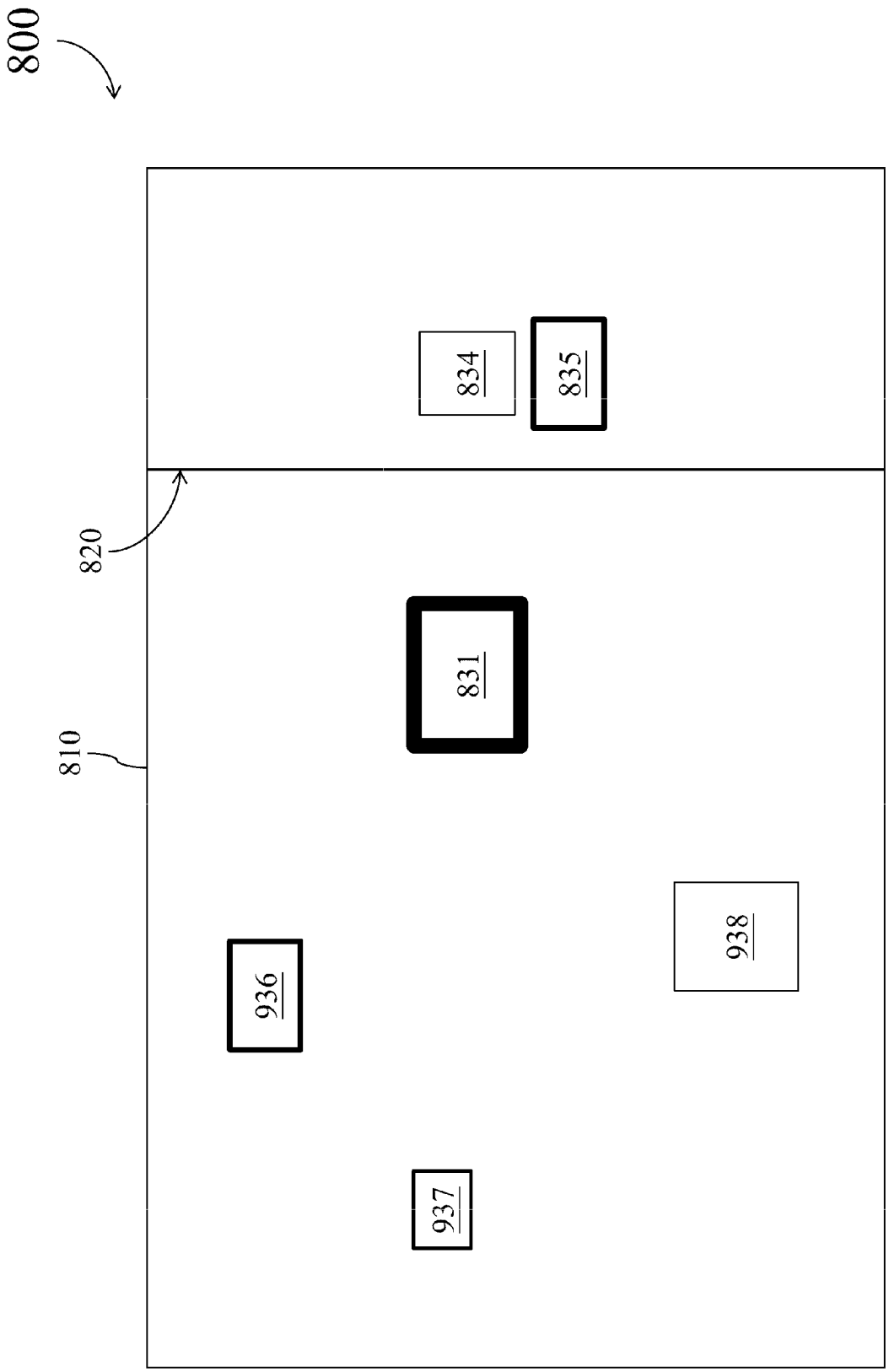

When the display device 125-a displays the GUI 800 as shown in FIG. 8, if the input device 124-a receives the aforementioned moving command, the displaying control module 240 performs the operation 706 in FIG. 7 to control the display device 125-a to synchronously move the reference indicator 820 and the option objects 831~835 a same horizontal distance toward the same direction SD2 according to the moving command, so that the GUI 800 is adjusted to become the pattern as illustrated in FIG. 9.

In this embodiment, the option objects 832 and 833 do not appear in FIG. 9 because they are moved to outside the scope of the rectangular area 810, but the option objects 831, 834, and 835 still appear in FIG. 9 since they still remain within the scope of the rectangular area 810 after moving the contents of the rectangular area 810. During the aforementioned moving process, the displaying control module 240 maintains the vertical positions of the option objects 831, 834, and 835 in the GUI 800 unchanged.

As shown in FIG. 9, after moving the contents of the rectangular area 810, three option objects 936, 937, and 938, which do not appear in FIG. 8, appear in the left side of the option object 831. As described previously, the user is allowed to rapidly recognize the photographing altitude relationship and the photographing azimuth relationship among the image data corresponding to the option objects 831, 834, 835, 936, 937, and 938 according to their vertical position difference and horizontal position difference. Therefore, the user is allowed to distinguish the photographing altitude differences as well as the photographing azimuth differences among different image data in a very intuitive visual manner. In this way, the user is enabled to take the photographing altitude differences and the photographing azimuth differences among different image data as important selection basis in selecting image data to be playbacked without frequently switching among different video images or wasting time to read other descriptive texts.

Figure 10:
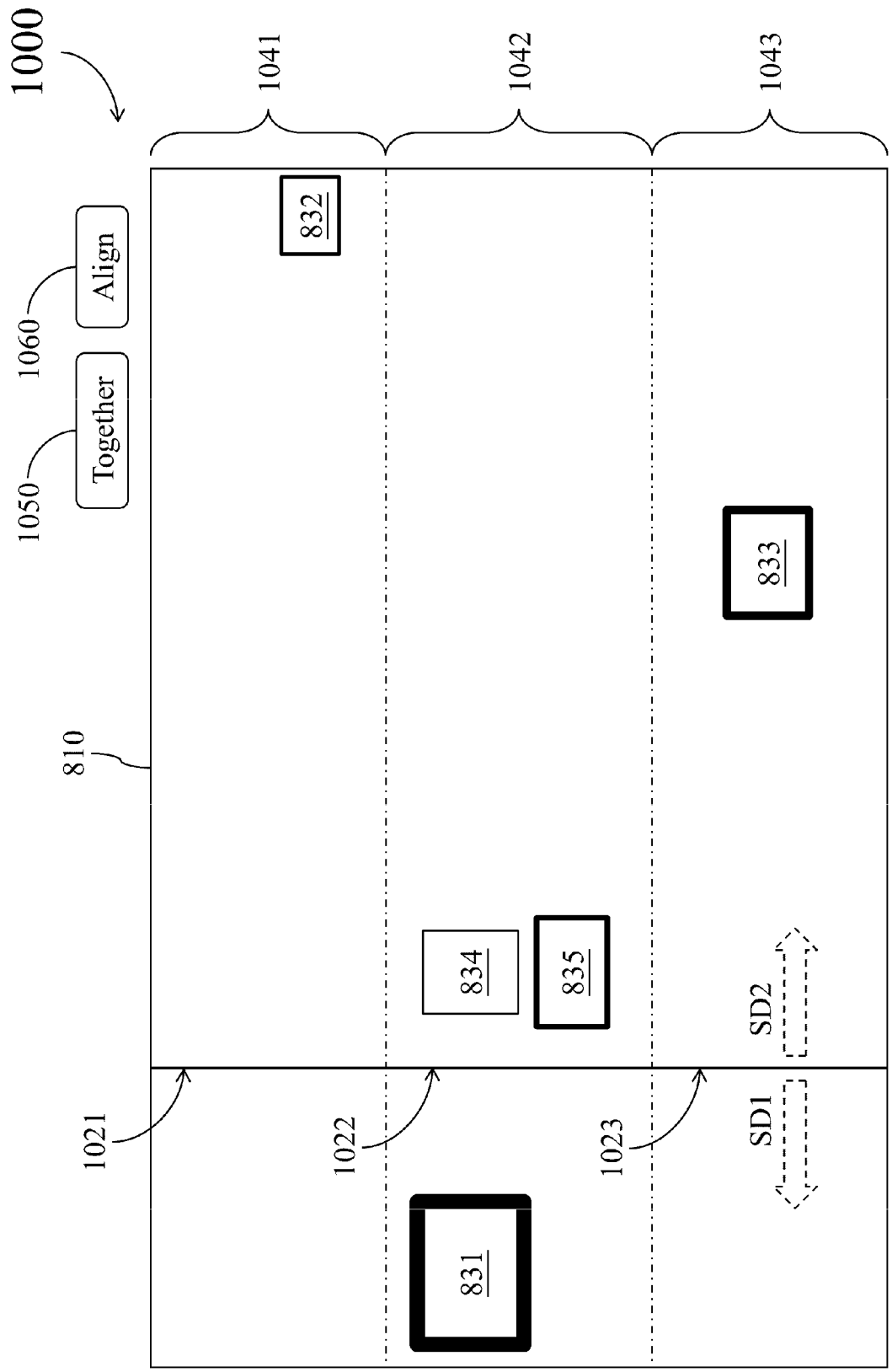

In practice, the arranging module 230 may further divide the rectangular area 810 in the GUI 800 into multiple ribbon regions respectively corresponding to multiple reference indicators, so that the photographing altitudes of the option objects within the same ribbon region fall within the same range. For example, FIG. 10 shows a simplified schematic diagram of a GUI 1000 according to another embodiment of the present disclosure. In the embodiment of FIG. 10, the arranging module 230 further divides the aforementioned rectangular area 810 into ribbon regions 1041~1043 respectively corresponding to reference indicators 1021~1023, so as to form the GUI 1000. The reference indicators 1021~1023 are respectively utilized for indicating the reference directions of the ribbon regions 1041~1043. In this embodiment, each of the reference indicators 1021~1023 may be utilized for indicating the site orientation direction D0 of the target site 410, and thus the user is allowed to understand the photographing azimuth relationship among the option objects currently displayed in each ribbon region, and to understand the horizontal position relationship between each option object and the site orientation direction D0 of the target site 410.

As shown in FIG. 10, the option object 832 is located within the ribbon region 1041; the option objects 831, 834, and 835 are located within the ribbon region 1042; and the option object 833 is located within the ribbon region 1043. The photographing altitudes corresponding to all option objects within the ribbon region 1041 are higher than the photographing altitudes corresponding to all option objects within the ribbon region 1042, while the photographing altitudes corresponding to all option objects within the ribbon region 1042 are higher than the photographing altitudes corresponding to all option objects within the ribbon region 1043.

The displaying control module 240 allows the user to independently adjust the contents within a single ribbon region in the GUI 1000 without affecting the contents within the other ribbon regions.

For example, assuming that the moving command referred in the operation 704 is utilized for requesting the GUI generating program 129-a to move the contents within the ribbon region 1042 of the GUI 1000 toward the right side, so that more contents arranged in the left side of the option object 831 can be displayed in the ribbon region 1042. In this situation, the displaying control module 240 in the aforementioned operation 706 may, according to the moving command, control the display device 125-a to synchronously move the option objects 831, 834, and 835 in the ribbon region 1042 a same horizontal distance toward the same direction, to correspondingly change the position of the reference indicator 1022, to maintain the positions of all option objects within other ribbon regions 1041 and 1043 unchanged, and to maintain the positions of other reference indicators 1021 and 1023 unchanged, so as to render the contents within the ribbon region 1042 to be adjusted to the pattern as illustrated in FIG. 11.

Figure 11:
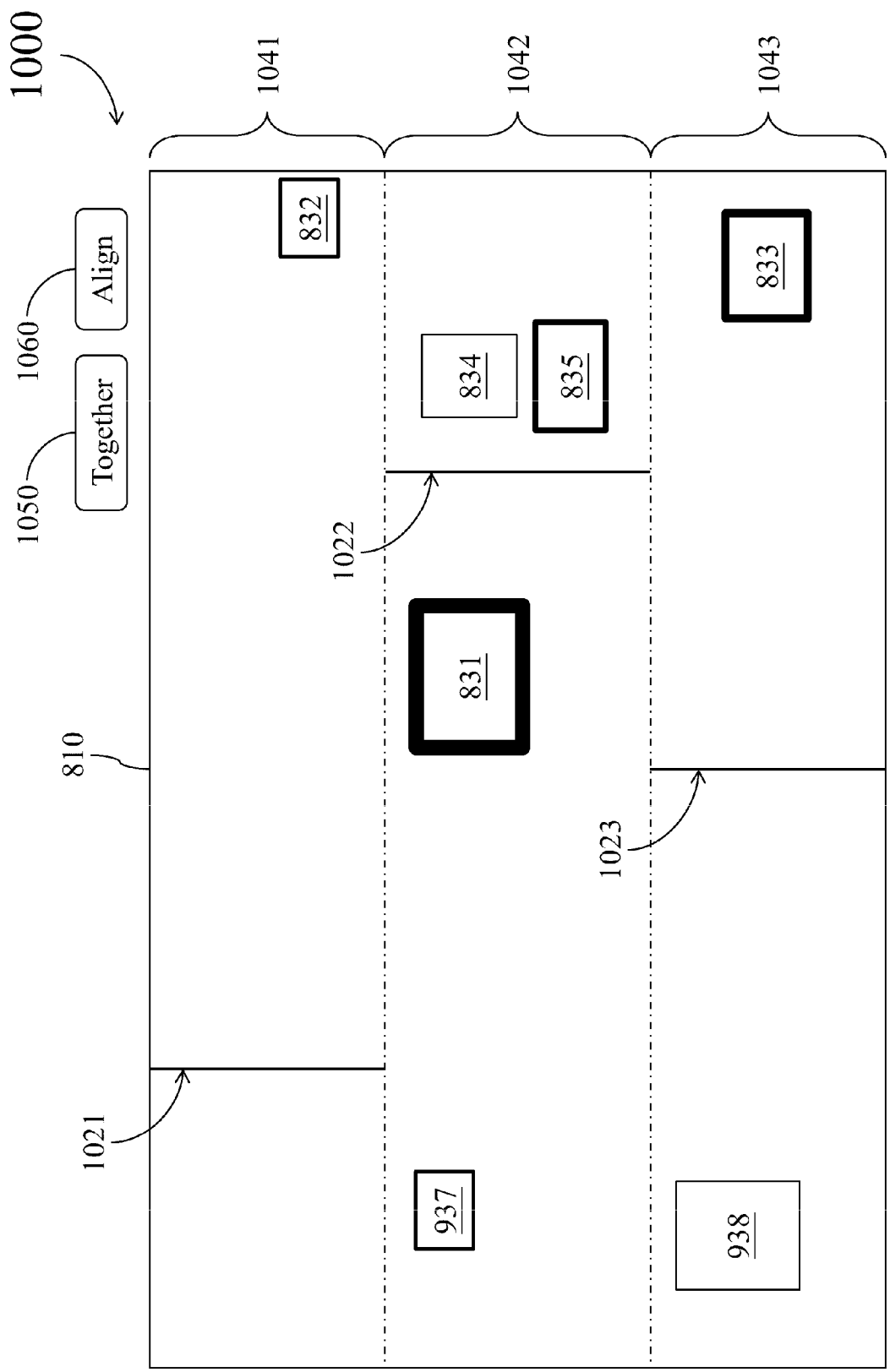

In the embodiment of FIG. 11, the option objects 831, 834, and 835 still appear in the ribbon region 1042 because they are still inside the scope of the ribbon region 1042 after moving the contents in the ribbon region 1042. In the above moving process, the displaying control module 240 maintains the vertical positions of the option objects 831, 834, and 835 in the GUI 1000 unchanged. In addition, as shown in FIG. 11, after moving the contents in the ribbon region 1042, an option object 937, which does not appear in FIG. 10, now appears in the left side of the option object 831.

In another example, assuming that the moving command referred in the operation 704 is utilized for requesting the GUI generating program 129-a to move the contents within the ribbon region 1043 of the GUI 1000 toward the right side from the pattern illustrated in FIG. 10, so that more contents arranged in the left side of the option object 833 can be displayed in the ribbon region 1043. In this situation, the displaying control module 240 in the aforementioned operation 706 may, according to the moving command, control the display device 125-a to synchronously move the reference indicator 1023 and the option object 833 a same horizontal distance toward the same direction, to maintain the positions of all option objects within other ribbon regions 1041 and 1042 unchanged, and to maintain the positions of other reference indicators 1021 and 1022 unchanged, so as to render the contents within the ribbon region 1043 to be adjusted to the pattern as illustrated in FIG. 11.

In the embodiment of FIG. 11, the option object 833 still appears in the ribbon region 1043 since it remains within the scope of the ribbon region 1043 after moving the contents of the ribbon region 1043. In addition, after moving the contents of the ribbon region 1043, an option object 938, which does not appear in FIG. 10, appears in the left side of the option object 833.

As described previously, the user is allowed to rapidly recognize the photographing altitude relationship and the photographing azimuth relationship among the image data corresponding to the option objects 831, 832, 833, 834, 835, 937, and 938 according to their vertical position difference and horizontal position difference without wasting time to read other descriptive texts.

In this embodiment, the displaying control module 240 further controls the display device 125-a to display a together button 1050 and an align button 1060 in the GUI 1000. The displaying control module 240 allows the user to issue a together shift command by firstly activating the together button 1050 and then issuing a moving command. After the displaying control module 240 controls the display device 125-a to move the multiple option objects within the ribbon region 1042 toward the same direction, if the input device 124-a receives the together shift command issued by the user, the displaying control module 240 may control the display device 125-a to synchronously move the multiple option objects currently located in the ribbon regions 1041~1043 toward the same direction and to also synchronously change the positions of the reference indicators 1021~1023, so as to create a visual effect showing that all option objects within the rectangular area 810 in the GUI 1000 are shifted together at the same time.

In addition, the displaying control module 240 allows the user to issue an align command by clicking the align button 1060. After the displaying control module 240 controls the display device 125-*a* to move the multiple option objects within the ribbon region 1042 toward the same direction, if the input device 124-*a* receives the align command issued by the user, the displaying control module 240 may control the display device 125-*a* to synchronously move the multiple option objects within at least one ribbon region of the ribbon regions 1041~1043 toward a same direction (e.g., toward the direction SD1 of FIG. 10) and to adjust the positions of the reference indicators 1021~1023 to be the same, so as to create a visual effect showing that all option objects within the rectangular area 810 in the GUI 1000 are rearranged to an aligned pattern similar to that as illustrated in FIG. 10.

Figure 12:
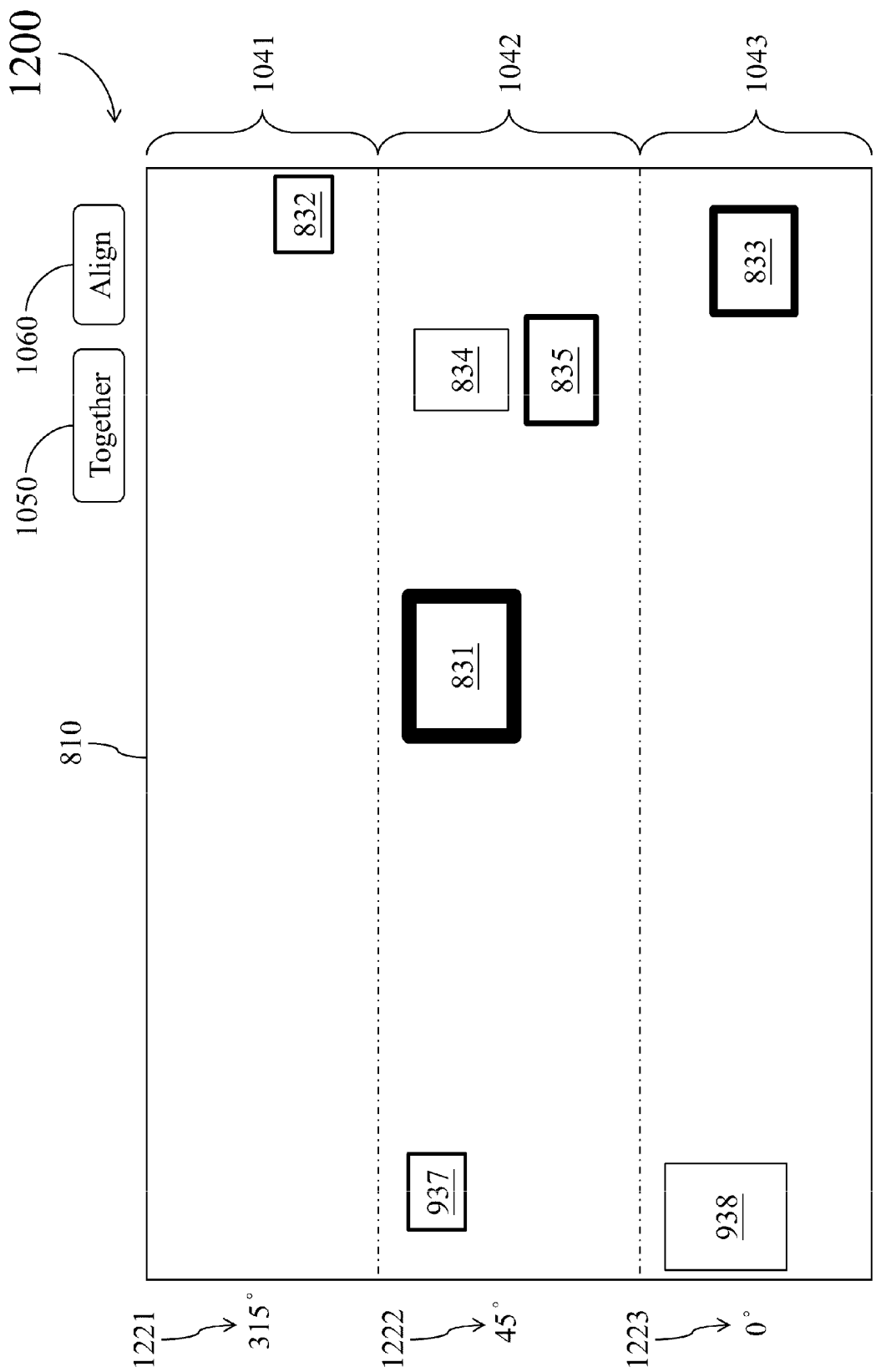

Please note that the reference indicators in the GUI arranged by the arranging module 230 are not restricted in the form of straight lines as illustrated in the foregoing embodiments. For example, FIG. 12 shows a simplified schematic diagram of a GUI 1200 according to another embodiment of the present disclosure. The GUI 1200 is similar to the GUI 1000, but in the embodiment of FIG. 12 the arranging module 230 realizes reference indicators 1221~1223 in the form of texts to replace the reference indicators 1021~1023 in the GUI 1000. In the embodiment of FIG. 12, each of the reference indicators 1221~1223 is utilized for indicating the horizontal position relationship between the site orientation direction D0 of the target site 410 and a specific part (e.g., the center portion, the right side boundary, or the left side boundary) of the ribbon regions 1041~1043. Accordingly, when the displaying control module 240 adjusts the contents of a specific ribbon region of the GUI 1200, the displaying control module 240 also changes the content of the reference indicator corresponding to the specific ribbon region, but does not change the contents of the reference indicators corresponding to the other ribbon regions. In practice, the arranging module 230 may utilize reference indicators realized in the form of other text formats, numbers, pointers, or animations to replace the aforementioned reference indicators 820 and 1021~1023.

The descriptions regarding other operations of the aforementioned GUI 1000 are also applicable to the embodiment of FIG. 12, and thus will not be repeatedly described herein.

Figure 13:
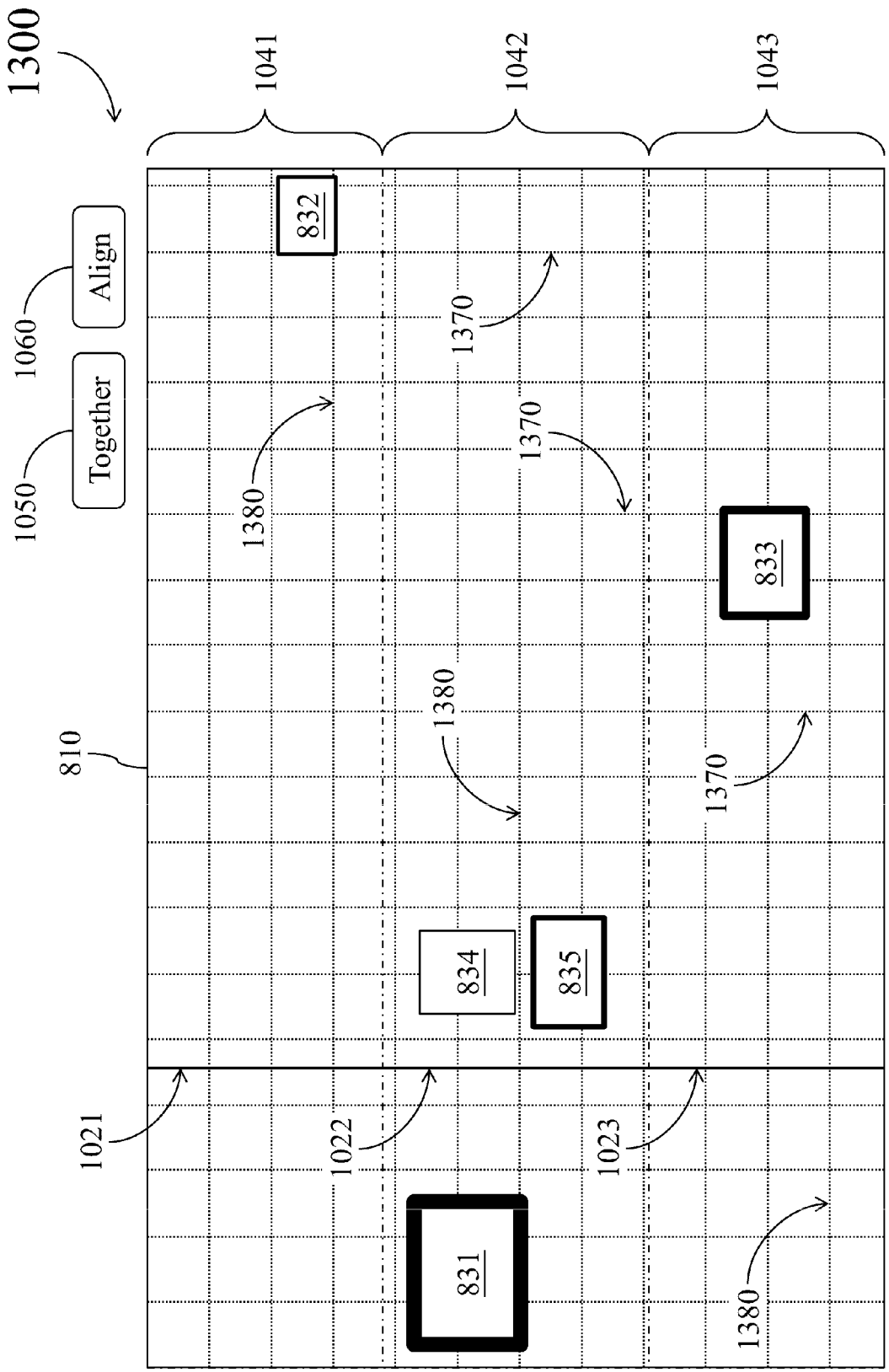
Figure 14:
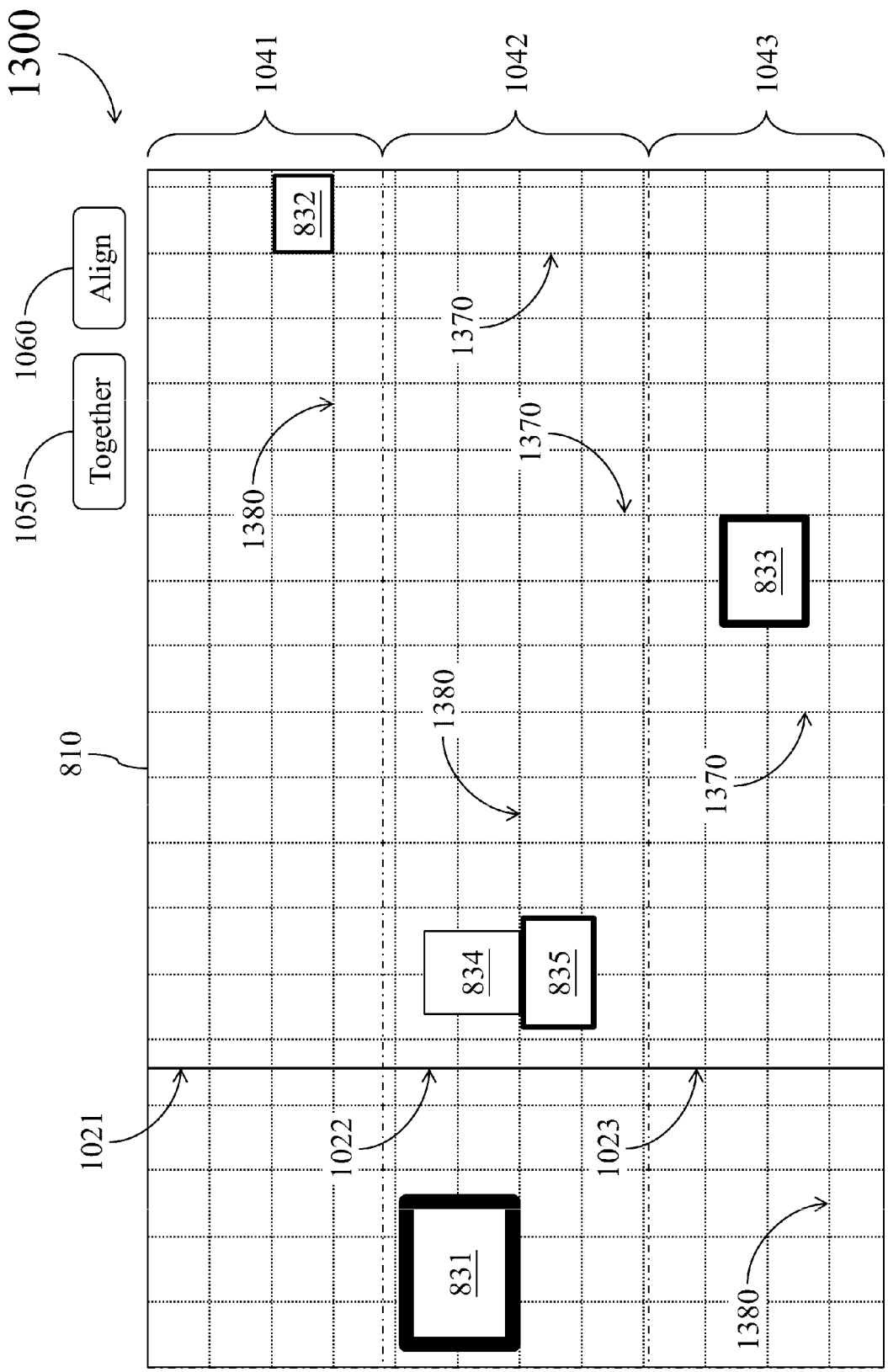

In practice, the displaying control module 240 may further define multiple vertical gridlines 1370 on the rectangular area 810 and also define multiple horizontal gridlines 1380 perpendicular to the multiple vertical gridlines 1370 on the rectangular area 810, so as to form a GUI 1300 as illustrated in FIG. 13. In this embodiment, the displaying control module 240 controls the display device 125-*a* to align each of the multiple option objects in the rectangular area 810 with at least one of the multiple vertical gridlines 1370 and the multiple horizontal gridlines 1380, so as to fine tune the positions of the multiple option objects in the GUI 1300 to become the pattern as illustrated in FIG. 14.

In practice, the displaying control module 240 may also control the display device 125-*a* to adaptively fine adjust the shapes and/or sizes of the multiple option objects in the GUI 1300, so that each option object is dimensioned to fit with an integer number of grids and each edge of the option object is aligned with one of the multiple vertical gridlines 1370 and the multiple horizontal gridlines 1380.

The aforementioned operation of fine adjusting the position, shape, and/or size of each option object by aligning the option object with the vertical gridline or the horizontal gridline provides more comfortable and ordered visual perception about the arrangement of the multiple option objects in the rectangular area 810 to human eyes, even though the position, shape, and/or size of each option object are not significantly changed.

The user is allowed to select a target option object out of the multiple option objects in the GUI as illustrated in the previous embodiments by issuing an option object selection command through the input device 124-*a*. For example, the user may select the option object 831 as the target option object by clicking the option object 831 on the foregoing GUI. In this situation, the receiving module 210 of the GUI generating program 129-*a* performs the operation 708 to utilize the input device 124-*a* to receive the option object selection command corresponding to the target option object 831.

In the operation 710, the transmitting module 250 controls the communication circuit 123-*a* to transmit an image data request corresponding to the target option object 831 to the image providing server 110 through the Internet 130 according to the option object selection command.

In the operation 712, the transmission circuit 115 of the image providing server 110 receives the image data request transmitted from the communication circuit 123-*a*.

In the operation 714, the processing circuit 113 utilizes the transmission circuit 115 to transmit a target image data corresponding to the target option object 831 to the communication circuit 123-*a* through the Internet 130 according to the image data request. In this embodiment, the target image data is the first image data corresponding to the target option object 831.

In the operation 716, the communication circuit 123-*a* receives the target image data transmitted from the image providing server 110

When the target image data is received by the communication circuit 123-*a*, the control circuit 127-*a* performs the operation 718 to control the display device 125-*a* to display the target image data.

In the previous embodiments, the arranging module 230 arranges the multiple option objects in the rectangular area 810 of the GUI, but this is merely an exemplary example, rather than a restriction to practical implementations. In addition, utilizing a thumbnail of corresponding image data to be the main part of an option object is merely an exemplary embodiment, rather than a restriction to practical implementations.

Figure 15:
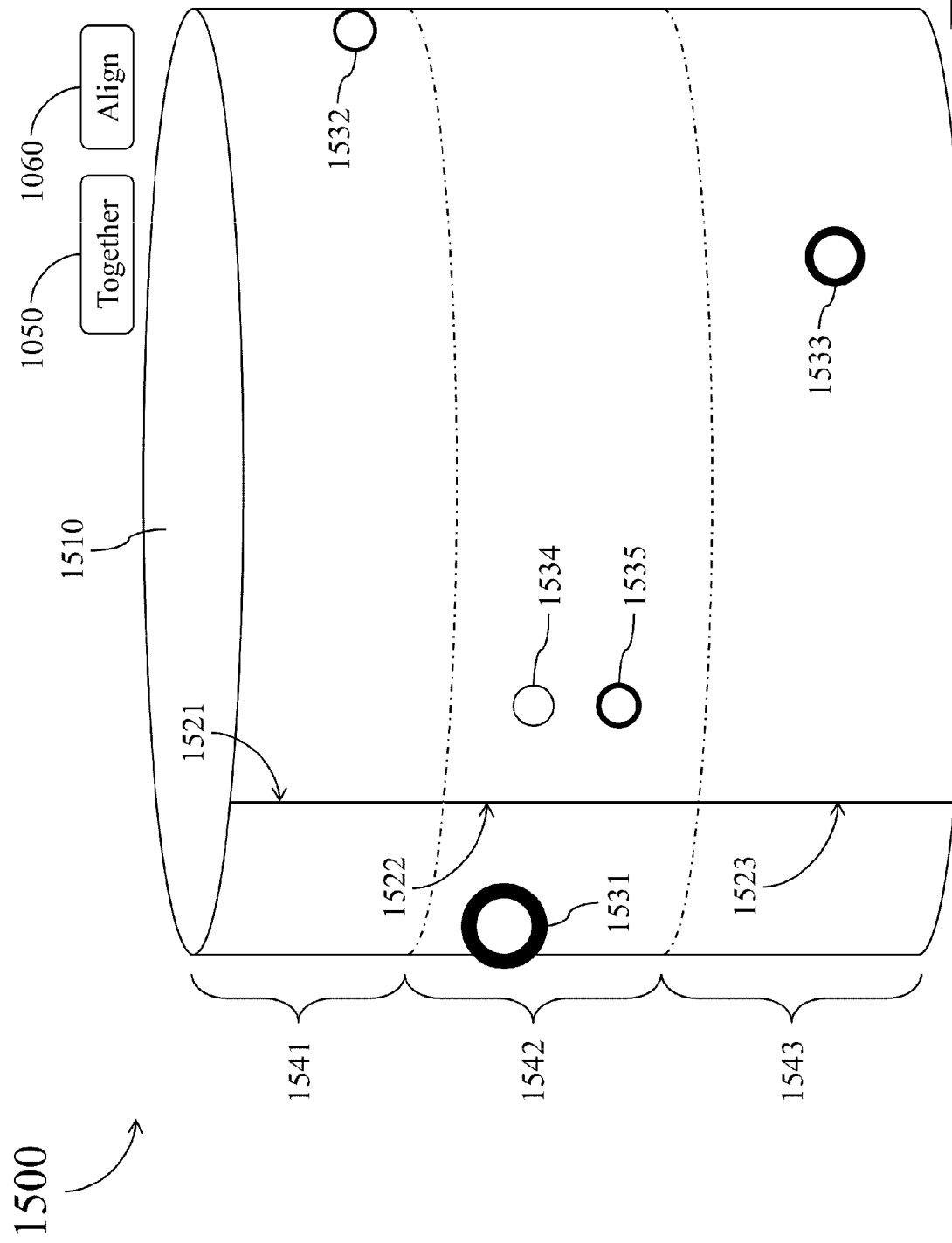

For example, FIG. 15 shows a simplified schematic diagram of a GUI 1500 according to another embodiment of the present disclosure. The GUI 1500 comprises a cylindrical object 1510, multiple reference indicators 1521~1523, and multiple option objects (e.g., the example option objects 1531~1535 shown in FIG. 15).

In the aforementioned operation 612, the option object generating module 220 may utilize the control circuit 127-*a* to dimension the main part of each of the multiple option objects 1531~1535 to be a predetermined geometrical graph to reduce the required area for displaying the option object.

In the aforementioned operation 614, the option object generating module 220 may utilize the control circuit 127-*a* to respectively configure the non-text visual indicators of the option objects 1531~1535 according to the multiple characteristic parameter sets. In this embodiment, the way that the option object generating module 220 respectively configures the non-text visual indicators of the option objects 1531~1535 according to the multiple characteristic parameter sets is the same as the way of configuring the visual indicators of the option objects 831~835 as elaborated previously.

Similarly, when the displaying control module 240 utilizes the display device 125-*a* to display the GUI 1500, the user is allowed to rapidly recognize the statistic data, the provider identity type, the aspect ratio, the resolution, and/or the image type of a specific image data corresponding to a specific option object according to the visual indicator of the specific option object without wasting time to read other descriptive texts. In this way, the user is thus allowed to take the statistic data, the provider identity type, the aspect ratio, the resolution, and/or the image type as important selection basis in deciding whether or not to select the specific image data.

In the aforementioned operation 616, the arranging module 230 may utilize the control circuit 127-*a* to arrange the multiple option objects including the option objects 1531~1535 according to the photographing positions distribution information provided by the image providing server 110 to generate the GUI 1500.

For illustrative purpose, it is assumed hereinafter that the image data and the photographing position data corresponding to the option objects 1531~1535 are respectively the same as that of the aforementioned option objects 831~835. That is, the option object 1531 corresponds to the first image data, the option object 1532 corresponds to the second image data, and the option object 1533 corresponds to the third image data referred in the previous embodiments. As described previously, the option object 1531 corresponds to the aforementioned first photographing azimuth A1 and also corresponds to the aforementioned first photographing altitude (e.g., H1); the option object 1532 corresponds to the aforementioned second photographing azimuth A2 and also corresponds to the aforementioned second photographing altitude (e.g., H2); the option object 1533 corresponds to the aforementioned third photographing azimuth A3 and also corresponds to the aforementioned third photographing altitude (e.g., H3); the option object 1534 corresponds to the aforementioned fourth photographing azimuth A4 of the multiple photographing azimuths and also corresponds to the aforementioned fourth photographing altitude (e.g., H4) of the multiple photographing altitudes; the option object 1535 corresponds to the aforementioned fifth photographing azimuth A5 of the multiple photographing azimuths and also corresponds to the aforementioned fifth photographing altitude (e.g., H5) of the multiple photographing altitudes. Additionally, as the same with the previous embodiments, the first photographing azimuth A1 is less than the second photographing azimuth A2, the second photographing azimuth A2 is less than the third photographing azimuth A3, the fourth photographing azimuth A4 is greater than the third photographing azimuth A3, the fifth photographing azimuth A5 is greater than the fourth photographing azimuth A4, the third photographing altitude is less than the first photographing altitude, the first photographing altitude is less than the second photographing altitude, the fourth photographing altitude is equal to the first photographing altitude, and the fifth photographing altitude is less than the fourth photographing altitude.

In the operation 616, the arranging module 230 utilizes the control circuit 127-*a* to present the cylindrical object 1510 in the GUI 1500, and utilizes the control circuit 127-*a* to arrange the option objects 1531~1535 on the lateral surface of the cylindrical object 1510 according to the multiple photographing azimuths and the multiple photographing altitudes. In order to match with the appearance of the lateral surface of the cylindrical object 1510, in the GUI 1500 of this embodiment, the arranging module 230 may arrange the option object 1533 to have a horizontal position in the left side of the option object 1532, arrange the option object 1531 to have a horizontal position in the left side of the option object 1533, configure a vertical position of the option object 1531 to be higher than a vertical position of the option object 1533, configure a vertical position of the option object 1532 to be higher than the vertical position of the option object 1531, configure the vertical position of the option object 1531 to be higher than a vertical position of the option object 1534, and arrange the option object 1535 to have the same horizontal position with the option object 1534, so as to form the arrangement as shown in FIG. 15.

In the embodiment of FIG. 15, the arranging module 230 further divides the lateral surface of the cylindrical object 1510 into multiple ribbon regions 1541~1543 corresponding to the multiple reference indicators 1521~1523, so that the photographing altitudes of the option objects within the same ribbon region fall within the same range. The reference indicators 1521~1523 are respectively utilized for indicating the reference directions of the ribbon regions 1541~1543. In this embodiment, each of the reference indicators 1521~1523 may be utilized for indicating the site orientation direction D0 of the target site 410, and thus the user is allowed to understand the photographing azimuth relationship among the option objects currently displayed in each ribbon region, and to understand the horizontal position relationship between each option object and the site orientation direction D0 of the target site 410.

As shown in FIG. 15, the option object 1532 is located within the ribbon region 1541; the option objects 1531, 1534, and 1535 are located within the ribbon region 1542; and the option object 1533 is located within the ribbon region 1543. The photographing altitudes corresponding to all option objects within the ribbon region 1541 are higher than the photographing altitudes corresponding to all option objects within the ribbon region 1542, while the photographing altitudes corresponding to all option objects within the ribbon region 1542 are higher than the photographing altitudes corresponding to all option objects within the ribbon region 1543.

Similarly, the displaying control module 240 allows the user to independently adjust the contents within a single ribbon region in the GUI 1500 without affecting the contents within the other ribbon regions.

For example, assuming that the moving command referred in the aforementioned operation 704 is utilized for requesting the GUI generating program 129-*a* to move the contents within the ribbon region 1542 of the GUI 1500 toward the right side, so that more contents arranged in the left side of the option object 1531 can be displayed in the ribbon region 1542. In this situation, the displaying control module 240 in the aforementioned operation 706 may, according to the moving command, control the display device 125-*a* to move the option objects 1531, 1534, and 1535 in the ribbon region 1542 toward the same side (i.e., toward the right side of FIG. 15) on the lateral surface of the cylindrical object 1510, to correspondingly change the position of the reference indicator 1522, to maintain the positions of all option objects within other ribbon regions 1541 and 1543 unchanged, and to maintain the positions of other reference indicators 1521 and 1523 unchanged, so as to render the contents within the ribbon region 1542 to be adjusted to the pattern as illustrated in FIG. 16.

Figure 16:
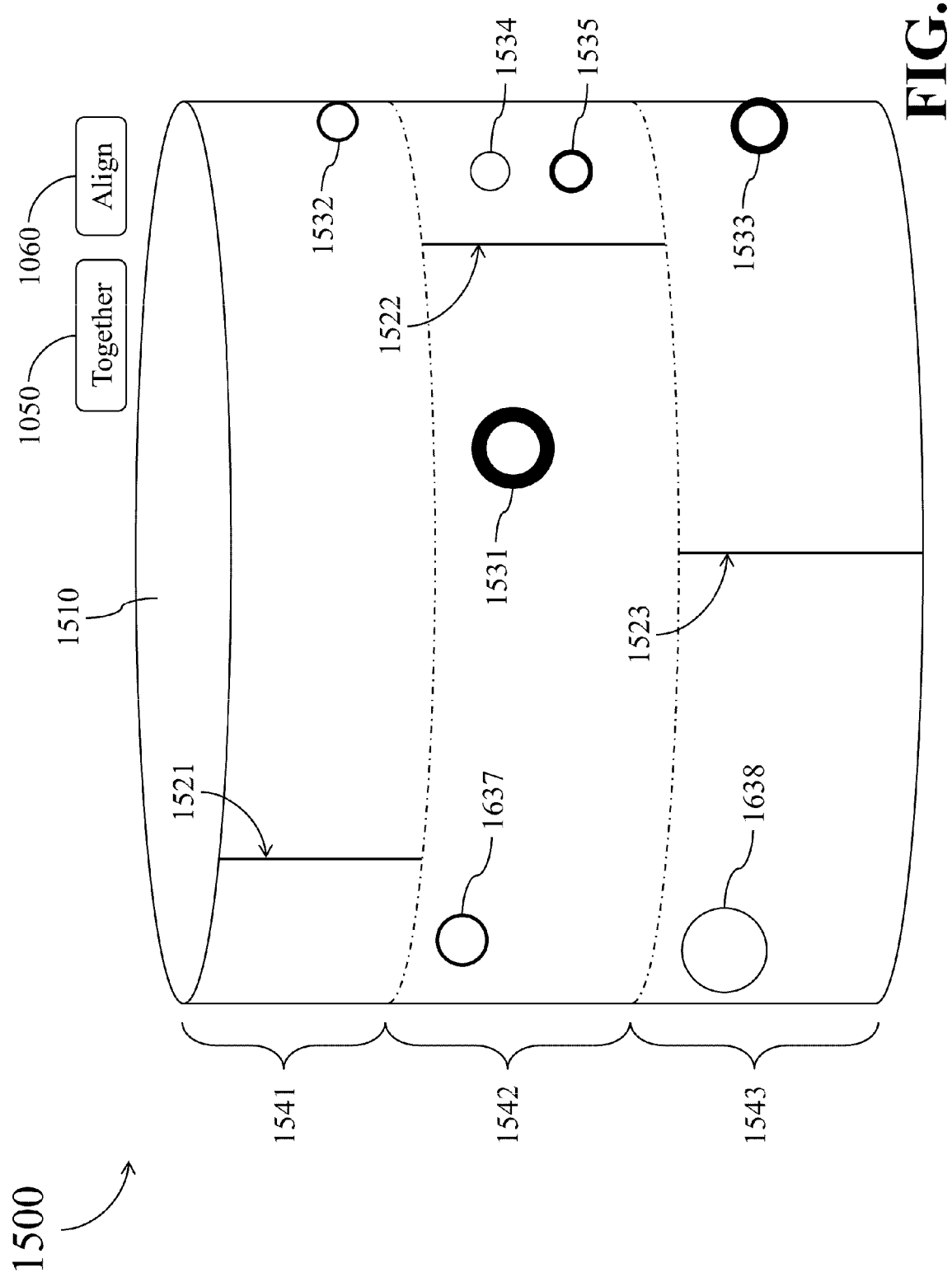

In the embodiment of FIG. 16, the option objects 1531, 1534, and 1535 still appear in the ribbon region 1542 because they are still inside the scope of the ribbon region 1542 after moving the contents in the ribbon region 1542. In the above moving process, the displaying control module 240 adjusts the vertical positions of the option objects 1531, 1534, and 1535 in the GUI 1500. In addition, as shown in FIG. 16, after moving the contents in the ribbon region 1542, an option object 1637, which does not appear in FIG. 15, now appears in the left side of the option object 1531.

In another example, assuming that the moving command referred in the operation 704 is utilized for requesting the GUI generating program 129-*a* to move the contents within the ribbon region 1543 toward the right side from the pattern illustrated in FIG. 15, so that more contents arranged in the left side of the option object 1533 can be displayed in the ribbon region 1543. In this situation, the displaying control module 240 in the aforementioned operation 706 may, according to the moving command, control the display device 125-*a* to move the reference indicator 1523 and the option object 1533 toward the same side on the lateral surface of the cylindrical object 1510, to maintain the positions of all option objects within other ribbon regions 1541 and 1542 unchanged, and to maintain the positions of other reference indicators 1521 and 1522 unchanged, so as to render the contents within the ribbon region 1543 to be adjusted to the pattern as illustrated in FIG. 16.

In the embodiment of FIG. 16, the option object 1533 still appears in the ribbon region 1543 since it remains within the scope of the ribbon region 1543 after moving the contents of the ribbon region 1543. In addition, after moving the contents of the ribbon region 1543, an option object 1638, which does not appear in FIG. 15, now appears in the left side of the option object 1533.

Similar to previous embodiments, the user is allowed to rapidly recognize the photographing altitude relationship and the photographing azimuth relationship among the image data corresponding to the option objects 1531, 1532, 1533, 1534, 1535, 1637, and 1638 according to their vertical position difference and horizontal position difference without wasting time to read other descriptive texts.

As illustrated in FIG. 15, the displaying control module 240 may further control the display device 125-*a* to display the aforementioned together button 1050 and align button 1060 in the GUI 1500. After the displaying control module 240 controls the display device 125-*a* to move the multiple option objects within the ribbon region 1542 toward the same side, if the input device 124-*a* receives the together shift command issued by the user, the displaying control module 240 may control the display device 125-*a* to move the multiple option objects currently located in the ribbon regions 1541~1543 toward the same side on the lateral surface of the cylindrical object 1510 and to synchronously change the positions of the reference indicators 1521~1523, so as to create a visual effect showing that all option objects on the lateral surface of the cylindrical object 1510 of the GUI 1500 are rotated together at the same time.

In addition, after the displaying control module 240 controls the display device 125-*a* to move the multiple option objects within the ribbon region 1542 toward the same side, if the input device 124-*a* receives an align command issued by the user, the displaying control module 240 may control the display device 125-*a* to move the multiple option objects within at least one ribbon region of the ribbon regions 1541~1543 toward a same side (e.g., toward the left side of FIG. 16) on the lateral surface of the cylindrical object 1510 and to adjust the positions of the reference indicators 1521~1523 to be the same, so as to create a visual effect showing that all option objects on the lateral surface of the cylindrical object 1510 of the GUI 1500 are rearranged to an aligned pattern similar to that illustrated in FIG. 15.

Similar to the previous embodiments, the displaying control module 240 may further define multiple vertical gridlines on the lateral surface of the cylindrical object 1510 and also define multiple annular gridlines perpendicular to the multiple vertical gridlines on the lateral surface of the cylindrical object 1510. The displaying control module 240 may control the display device 125-*a* to align each of the multiple option objects on the lateral surface of the cylindrical object 1510 with at least one of the multiple vertical gridlines and the multiple annular gridlines. Similarly, the displaying control module 240 may also control the display device 125-*a* to adaptively fine adjust the shapes and/or sizes of the multiple option objects on the lateral surface of the cylindrical object 1510, so that each option object is dimensioned to fit with an integer number of grids and each edge of the option object is aligned with one of the multiple vertical gridlines and the multiple annular gridlines.

The aforementioned operation of fine adjusting the position, shape, and/or size of each option object by aligning the option object with the vertical gridline or the annular gridline also provides more comfortable and ordered visual perception about the arrangement of the multiple option objects on the lateral surface of the cylindrical object 1510 to human eyes.

In practice, the arranging module 230 may utilize reference indicators realized in the form of other text formats, numbers, pointers, or animations to replace the aforementioned reference indicators 1521~1523.

The descriptions regarding other operations of the aforementioned GUI 800~GUI 1300 are also applicable to the embodiments of FIG. 15 and FIG. 16, and thus will not be repeatedly described herein.

Figure 17:
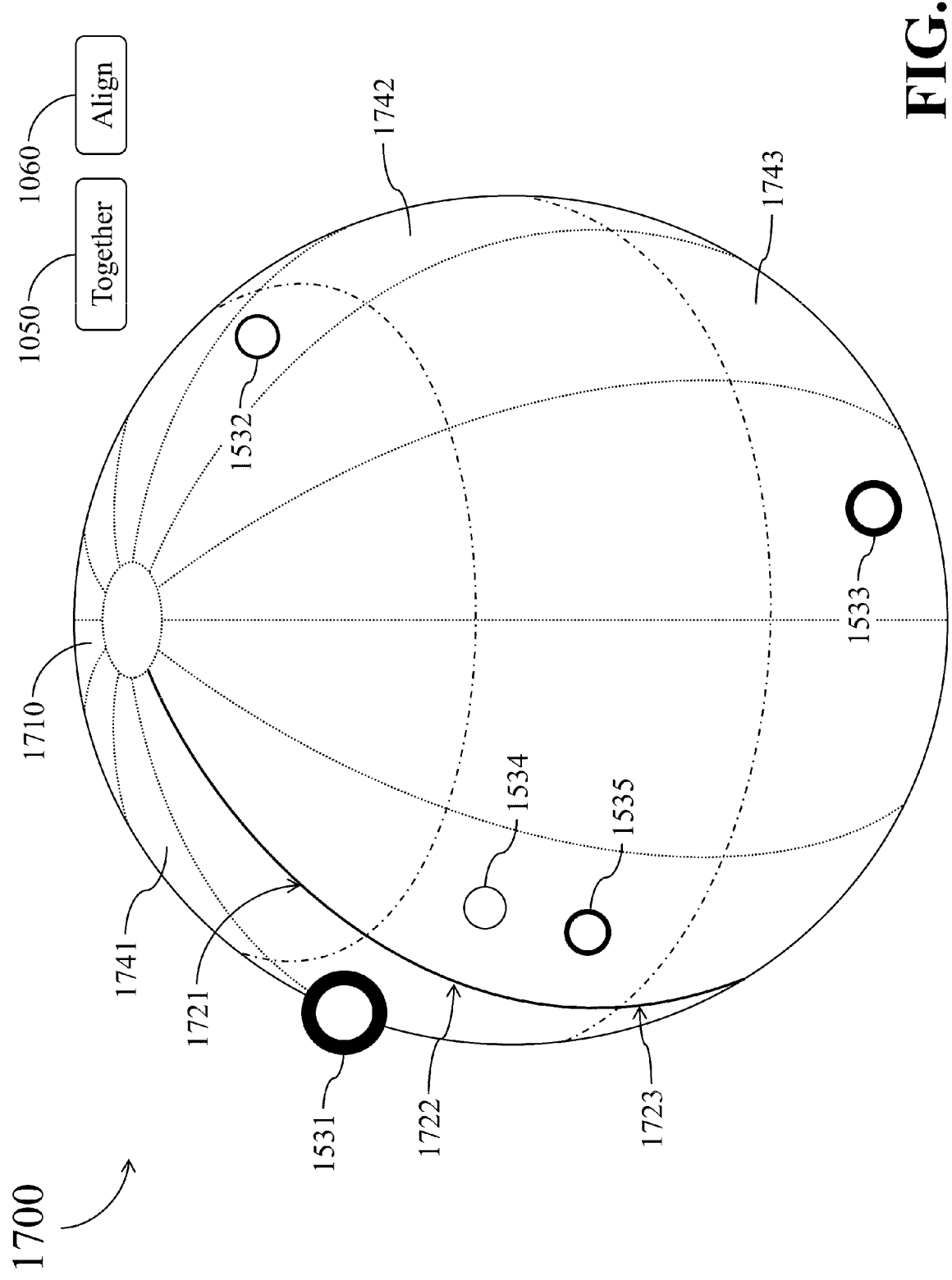

FIG. 17 shows a simplified schematic diagram of a GUI 1700 according to another embodiment of the present disclosure. The GUI 1700 comprises a spherical object 1710, multiple reference indicators 1721~1723, and multiple option objects (e.g., the example option objects 1531~1535 shown in FIG. 17). The option objects 1531~1535 in FIG. 17 are the same as the option objects 1531~1535 illustrated in aforementioned FIG. 15 and FIG. 16. Additionally, in this embodiment, the operations of the option object generating module 220 in the operations 612 and 614 are the same as that in the embodiments of FIG. 15 and FIG. 16, and thus will not be repeatedly described here.

In the operation 616, the arranging module 230 utilizes the control circuit 127-*a* to present the spherical object 1710 in the GUI 1700, and utilizes the control circuit 127-*a* to arrange the option objects 1531~1535 on the spherical surface of the spherical object 1710 according to the multiple photographing azimuths and the multiple photographing altitudes. In order to match with the appearance of the spherical surface of the spherical object 1710, in the GUI 1700 of this embodiment, the arranging module 230 may arrange the option object 1533 to have a horizontal position in the left side of the option object 1532, arrange the option object 1531 to have a horizontal position in the left side of the option object 1533, configure a vertical position of the option object 1531 to be higher than a vertical position of the option object 1533, configure a vertical position of the option object 1532 to be higher than the vertical position of the option object 1531, configure the vertical position of the option object 1531 to be higher than a vertical position of the option object 1534, and arrange the option object 1535 to have a horizontal position in the left side of the option object 1534, so as to form the arrangement as shown in FIG. 17.

In the embodiment of FIG. 17, the arranging module 230 further divides the spherical surface of the spherical object 1710 into multiple ribbon regions 1741~1743 corresponding to the multiple reference indicators 1721~1723, so that the photographing altitudes of the option objects within the same ribbon region fall within the same range. The reference indicators 1721~1723 are respectively utilized for indicating the reference directions of the ribbon regions 1741~1743. In this embodiment, each of the reference indicators 1721~1723 may be utilized for indicating the site orientation direction D0 of the target site 410, thereby allowing the user to understand the photographing azimuth relationship among the option objects currently displayed in each ribbon region and to understand the horizontal position relationship between each option object and the site orientation direction D0 of the target site 410.

As shown in FIG. 17, the option object 1532 is located within the ribbon region 1741; the option objects 1531, 1534, and 1535 are located within the ribbon region 1742; and the option object 1533 is located within the ribbon region 1743. The photographing altitudes corresponding to all option objects within the ribbon region 1741 are higher than the photographing altitudes corresponding to all option objects within the ribbon region 1742, while the photographing altitudes corresponding to all option objects within the ribbon region 1742 are higher than the photographing altitudes corresponding to all option objects within the ribbon region 1743.

Similarly, the displaying control module 240 allows the user to independently adjust the contents within a single ribbon region in the GUI 1700 without affecting the contents within the other ribbon regions.

For example, assuming that the moving command referred in the aforementioned operation 704 is utilized for requesting the GUI generating program 129-*a* to move the contents within the ribbon region 1742 of the GUI 1700 toward the right side, so that more contents arranged in the left side of the option object 1531 can be displayed in the ribbon region 1742. In this situation, the displaying control module 240 in the aforementioned operation 706 may, according to the moving command, control the display device 125-*a* to move the option objects 1531, 1534, and 1535 in the ribbon region 1742 toward the same side (i.e., toward the right side of FIG. 17) on the spherical surface of the spherical object 1710, to correspondingly change the position of the reference indicator 1722, to maintain the positions of all option objects within other ribbon regions 1741 and 1743 unchanged, and to maintain the positions of other reference indicators 1721 and 1723 unchanged, so as to render the contents within the ribbon region 1742 to be adjusted to the pattern as illustrated in FIG. 18.

Figure 18:
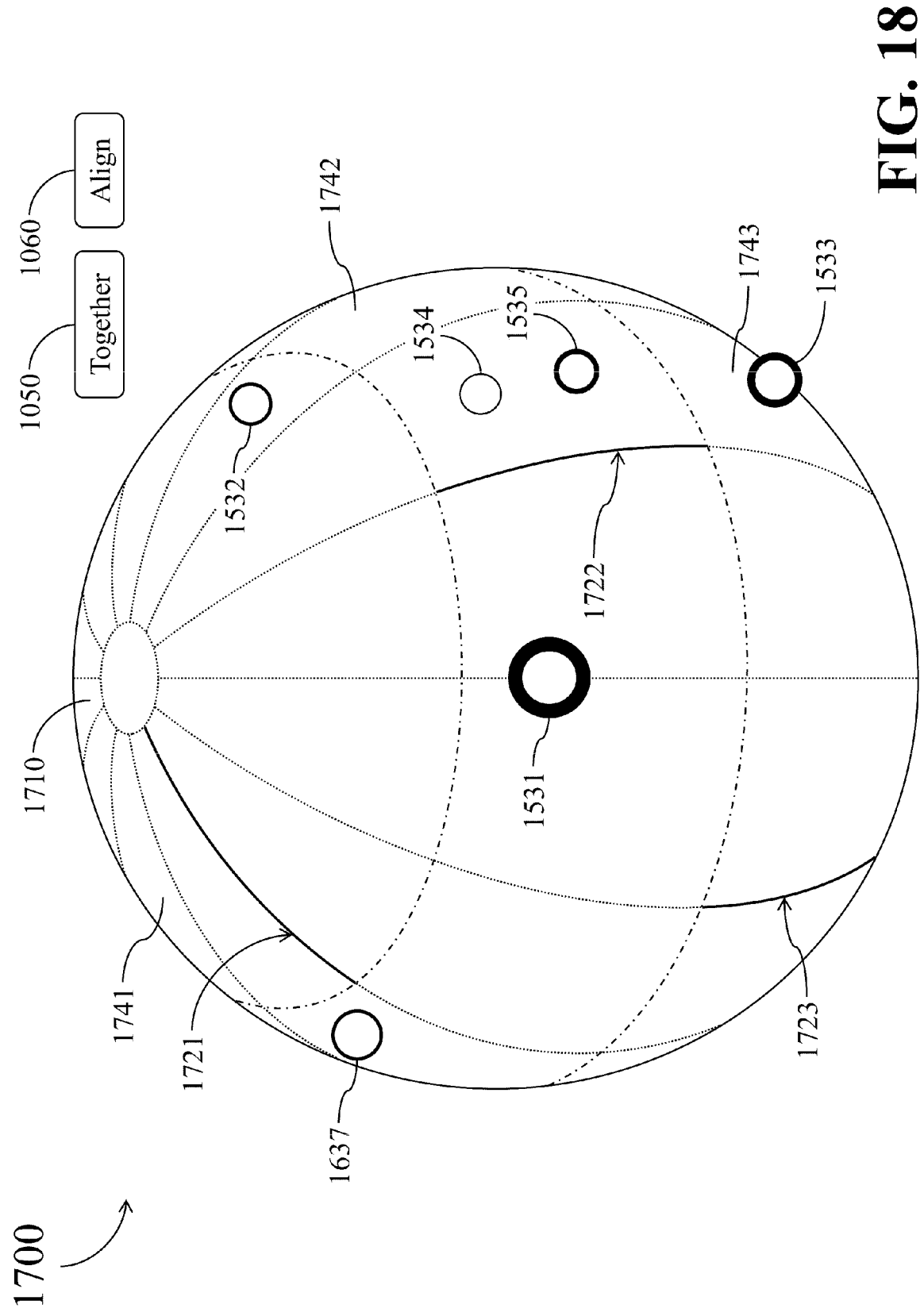

In the embodiment of FIG. 18, the option objects 1531, 1534, and 1535 still appear in the ribbon region 1742 because they are still inside the scope of the ribbon region 1742 after moving the contents in the ribbon region 1742. In the above moving process, the displaying control module 240 adjusts the vertical positions of the option objects 1531, 1534, and 1535 in the GUI 1700. In addition, as shown in FIG. 18, after moving the contents in the ribbon region 1742, the option object 1637, which does not appear in FIG. 17, now appears in the left side of the option object 1531.

In another example, assuming that the moving command referred in the operation 704 is utilized for requesting the GUI generating program 129-*a* to move the contents within the ribbon region 1743 toward the right side from the pattern illustrated in FIG. 17, so that more contents arranged in the left side of the option object 1533 can be displayed in the ribbon region 1743. In this situation, the displaying control module 240 in the aforementioned operation 706 may, according to the moving command, control the display device 125-*a* to move the reference indicator 1723 and the option object 1533 toward the same side on the spherical surface of the spherical object 1710, to maintain the positions of all option objects within other ribbon regions 1741 and 1742 unchanged, and to maintain the positions of other reference indicators 1721 and 1722 unchanged, so as to render the contents within the ribbon region 1743 to be adjusted to the pattern as illustrated in FIG. 18.

In the embodiment of FIG. 18, the option object 1533 still appears in the ribbon region 1743 since it remains within the scope of the ribbon region 1743 after moving the contents of the ribbon region 1743. Unlike the situation of the previous embodiment, some option objects that do not appear in FIG. 17 may either appear in FIG. 18 since the display areas in the north and south portions of the spherical object 1710 are relatively limited.

Similar to previous embodiments, the user is allowed to rapidly recognize the photographing altitude relationship and the photographing azimuth relationship among the image data corresponding to the option objects 1531, 1532, 1533, 1534, 1535, and 1637 according to their vertical position difference and horizontal position difference without wasting time to read other descriptive texts.

As illustrated in FIG. 17, the displaying control module 240 may further control the display device 125-*a* to display the aforementioned together button 1050 and align button 1060 in the GUI 1700. After the displaying control module 240 controls the display device 125-*a* to move the multiple option objects within the ribbon region 1742 toward the same side, if the input device 124-*a* receives the together shift command issued by the user, the displaying control module 240 may control the display device 125-*a* to move the multiple option objects currently located in the ribbon regions 1741~1743 toward the same side on the spherical surface of the spherical object 1710 and to synchronously change the positions of the reference indicators 1721~1723, so as to create a visual effect showing that all option objects on the spherical surface of the spherical object 1710 of the GUI 1700 are rotated together at the same time.

In addition, after the displaying control module 240 controls the display device 125-*a* to move the multiple option objects within the ribbon region 1742 toward the same side, if the input device 124-*a* receives an align command issued by the user, the displaying control module 240 may control the display device 125-*a* to move the multiple option objects within at least one ribbon region of the ribbon regions 1741~1743 toward a same side (e.g., toward the left side of FIG. 18) on the spherical surface of the spherical object 1710 and to adjust the positions of the reference indicators 1721~1723 to be matched up, so as to create a visual effect showing that all option objects on the spherical surface of the spherical object 1710 of the GUI 1700 are rearranged to an aligned pattern similar to that illustrated in FIG. 17.

In the embodiments of FIG. 17 and FIG. 18, if the together shift command received by the input device 124-*a* is directed to a request for shifting option objects vertically, the displaying control module 240 may control the display device 125-*a* to move multiple option objects currently located in the ribbon regions 1741~1743 upward or downward on the spherical surface of the spherical object 1710 and to synchronously change the positions of the reference indicators 1721~1723 to create a visual effect showing that all option objects on the spherical surface of the spherical object 1710 of the GUI 1700 are rotated vertically at the same time.

Similar to the previous embodiments, the displaying control module 240 may further define multiple longitude lines (not shown) on the spherical surface of the spherical object 1710 and also define multiple latitude lines (not shown) perpendicular to the multiple longitude lines on the spherical surface of the spherical object 1710. The displaying control module 240 may control the display device 125-*a* to align each of the multiple option objects on the spherical surface of the spherical object 1710 with at least one of the multiple longitude lines and the multiple latitude lines. Similarly, the displaying control module 240 may also control the display device 125-*a* to adaptively fine adjust the shapes and/or sizes of the multiple option objects on the spherical surface of the spherical object 1710, so that each option object is dimensioned to fit with an integer number of grids and each edge of the option object is aligned with one of the multiple longitude lines and the multiple latitude lines.

The aforementioned operation of fine adjusting the position, shape, and/or size of each option object by aligning the option object with one of the longitude lines and the latitude lines also provides more comfortable and ordered visual perception about the arrangement of the multiple option objects on the spherical surface of the spherical object 1710 to human eyes.

In addition, the arranging module 230 may utilize reference indicators realized in the form of other text formats, numbers, pointers, or animations to replace the aforementioned reference indicators 1721~1723.

The descriptions regarding other operations of the aforementioned GUI 800~GUI 1500 are also applicable to the embodiments of FIG. 17 and FIG. 18, and thus will not be repeatedly described herein.

In comparison with the spherical object 1710 in the embodiments of FIG. 17 and FIG. 18, the lateral surface of the cylindrical object 1510 in the embodiments of FIG. 15 and FIG. 16 provides more area for displaying option objects, and is thus able to present more option objects at the same time. In comparison with the cylindrical object 1510 in the embodiments of FIG. 15 and FIG. 16, the spherical object 1710 in the embodiments of FIG. 17 and FIG. 18 allows the user to vertically rotate the spherical object 1710 upward or downward, and is thus able to provide more flexible and fancy GUI manipulation experience to the user.

It can be appreciated from the foregoing elaborations that the multiple option objects in the GUIs disclosed previously are arranged in the GUI based on the photographing positions distribution information of the multiple image data. Accordingly, the user is allowed to rapidly recognize the photographing altitude relationship among the image data corresponding to these option objects according to the vertical position differences among these option objects. In addition, the user is also allowed to rapidly recognize the photographing azimuth relationship among the image data corresponding to these option objects according to the horizontal position differences among these option objects. In other words, the disclosed GUIs illustrated previously enable the user to distinguish the photographing altitude differences as well as the photographing azimuth differences among different image data through a very intuitive visual perception. In this way, the user is enabled to quickly understand the spatial relationship of the photographing positions of different image data without frequently switching among different images. As a result, the user is thus enabled to take the spatial relationship of the photographing positions of different image data as important selection basis in selecting image data without frequently switching among different images or wasting time to read other descriptive texts.

In addition, the user is also allowed to rapidly recognize the statistic data, the provider identity type, the aspect ratio, the resolution, and/or the image type of a specific image data corresponding to a specific option object according to the visual indicator of the specific option object without wasting time to read other descriptive texts. In this way, the user is thus allowed to take the statistic data, the provider identity type, the aspect ratio, the resolution, and/or the image type as important selection basis in deciding whether or not to select the specific image data.

From another aspect, the disclosed GUIs elaborated previously provide non-text selection basis for selecting image data to the user in a more intuitive approach, which effectively reduces the required time for the user in reading texts, thereby significantly reducing the required time for the user in searching for image data of interest.

Furthermore, the disclosed approach of fine adjusting the positions of the option objects by aligning each of the option objects with a vertical gridline, a horizontal gridline, or an annular gridline provides the human eyes with more comfortable and ordered visual perception about the arrangement of the option objects.

Since the image data corresponding to different option objects in each of the disclosed GUIs elaborated previously are all related to the location of a target site or an event occurred at the target site, the user is allowed to precisely locate the image data related to different aspects of the target site and thus able to obtain more comprehensive and more rich visual perception about the target site without spending a lot of time to read descriptive texts.

In practice, the quantity of the ribbon regions in the GUI divided by the arranging module 230 is not restricted to the example shown in the previous embodiments, and may be increased or decreased based on the design requirement or the user's configuration.

Please note that the execution order of the operations in FIG. 3 is merely an exemplary embodiment rather than a restriction to practical implementations. For example, the operation 314 may be performed between the operations 316 and 318, may be performed between the operations 318 and 320, or may be performed simultaneously with the operation 316, 318, or 320. In addition, the operation 320 may be performed before the operation 314, 316, or 318, or may be performed simultaneously with one of the above operations.

In the previous embodiments, it is assumed that the site orientation data is defined by the operator of the image providing server 110 and utilized for representing the site orientation direction D0 of the target site 410, but this is merely an exemplary embodiment rather than a restriction to practical implementations. As described previously, the site orientation data may be a specific reference direction calculated by the processing circuit 113 of the image providing server 110 using a predetermined approach. In some embodiments, for example, while the image capturing circuit 121 generates the image data by photographing something, the aforementioned multiple image source devices may utilize the positioning circuit 122 or other circuit (e.g., a built-in gyroscope circuit) to calculate the lens orientation direction of the image capturing circuit 121, and generate a lens orientation data for representing the lens orientation direction. Therefore, the aforementioned multiple image source devices may further generate multiple lens orientation data respectively corresponding to the multiple image data in the operation 306, and then transmit the multiple lens orientation data to the image providing server 110 in the operation 308. In this situation, the processing circuit 113 of the image providing server 110 may calculate a specific reference direction by adopting a majority voting approach or other algorithms based on the multiple lens orientation data after the operation 310, and then utilize a data for representing the specific reference direction as the aforementioned site orientation data.

In some embodiments, at least one of the aforementioned operations 316~318 may be omitted to reduce the computations to be conducted by the image providing server 110.

When the operation 318 is omitted, the operation 614 in FIG. 6 may be omitted to reduce the computations to be conducted by the image playback device 120.

Additionally, in some applications where the image data required in the image sharing system 100 are not provided by the image playback device 120, the image capturing circuit 121 and the positioning circuit 122 of the image playback device 120 may be omitted to reduce the circuitry complexity of the image playback device 120.

In the aforementioned image sharing system 100, the GUI generating program 129 stored in the memory 126 of the image playback device 120 may be an application program or plug-in program advance downloaded by the image playback device 120 from the image providing server 110 or other servers through the Internet 130, and then installed to the image playback device 120.

Alternatively, the GUI generating program 129 may be provided to the image playback device 120 by the image providing server 110 while performing the operations in FIG. 6. For example, when the image enquiry request transmitted from the image playback device 120 is received by the image providing server 110, the image providing server 110 may attach the GUI generating program 129 to data or program codes to be transmitted to the image playback device 120 and then transmit to the image playback device 120. That is, the image providing server 110 may transmit the GUI generating program 129 to the image playback device 120 in the aforementioned operation 608.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An image sharing system, comprising:
    an image providing server, comprising:
        a storage device, configured to operably store a site location data and a site orientation data of a target site, multiple image data, and multiple photographing position data respectively corresponding to multiple image data, wherein each of the multiple image data is photographed within a predetermined distance from the target site or contains at least a portion of image content of an event occurred at the target site;
        a processing circuit, coupled with the storage device, configured to operably calculate a photographing positions distribution information representing a spatial distribution of the multiple photographing position data according to the site location data, the site orientation data, and the multiple photographing position data; and
        a transmission circuit, coupled with the processing circuit, configured to operably transmit the photographing positions distribution information through Internet after an image enquiry request is received; and
    an image playback device, comprising:
        an input device, configured to operably generate the image enquiry request according to a user's manipulation;
        a communication circuit, configured to operably transmit the image enquiry request to the transmission circuit of the image providing server through the Internet, and to operably receive the photographing positions distribution information transmitted from the transmission circuit;
        a control circuit, coupled with the communication circuit and the input device, configured to operably generate multiple option objects respectively corresponding to the multiple image data, and to operably arrange the multiple option objects according to the photographing positions distribution information so as to generate a graphic user interface (GUI) containing the multiple option objects and one or more reference indicators; and
        a display device, coupled with the control circuit, configured to operably display the GUI;
    wherein when the display device displays the GUI, if a moving command issued by the user is received by the input device, the control circuit controls the display device to move at least part of the multiple option objects in the GUI toward a same side and to correspondingly change position or content of at least one of the one or more reference indicators, and if an option object selection command corresponding to a target option object in the GUI is received by the input device, the control circuit controls the communication circuit to transmit an image data request corresponding to the target option object to the transmission circuit of the image providing server through the Internet;
    wherein when the image data request is received by the image providing server, the processing circuit controls the transmission circuit to transmit a target image data out of the multiple image data to the communication circuit through the Internet, and when the target image data is received by the communication circuit, the control circuit controls the display device to display the target image data.

2. The image sharing system of claim 1, wherein the processing circuit further configures multiple characteristic parameter sets respectively corresponding to the multiple image data, and controls the transmission circuit to transmit the multiple characteristic parameter sets to the communication circuit through the Internet;
    wherein the communication circuit receives the multiple characteristic parameter sets transmitted from the image providing server, and the control circuit configures one or more visual indicators for each of the multiple option objects according to the multiple characteristic parameter sets.

3. The image sharing system of claim 2, wherein the control circuit configures at least one of following visual indicators for the target option object according to a target characteristic parameter set out of the multiple characteristic parameter sets:
- a size of the target option object;
- a color of the target option object;
- a shape of the target option object;
- an outer frame color of the target option object; and
- an outer frame thickness of the target option object.

4. The image sharing system of claim 3, wherein the target characteristic parameter set corresponds to the target image data, and the processing circuit configures the target characteristic parameter set according to at least one of following parameters of the target image data:
- a statistic data of the target image data;
- an identity type of a provider of the target image data;
- an aspect ratio of the target image data;
- a resolution of the target image data; and
- an image type of the target image data;
- wherein the statistic data corresponds to a ranking score of the target image data or an annotation count of the target image data.

5. The image sharing system of claim 3, wherein the one or more visual indicators of the target option object are utilized for representing at least one of following parameters of the target image data:
- a statistic data of the target image data;
- an identity type of a provider of the target image data;
- an aspect ratio of the target image data;
- a resolution of the target image data; and
- an image type of the target image data;
- wherein the statistic data corresponds to a ranking score of the target image data or an annotation count of the target image data.

6. The image sharing system of claim 1, wherein the processing circuit is further configured to operably generate multiple thumbnails respectively corresponding to the multiple image data, and to operably control the transmission circuit to transmit the multiple thumbnails to the communication circuit through the Internet;
wherein the control circuit is further configured to respectively utilize the multiple thumbnails to be main parts of the multiple option objects.

7. The image sharing system of claim 1, wherein the control circuit further configures each of the main parts of the multiple option objects to be shaped as a predetermined geometrical graph.

8. The image sharing system of claim 1, wherein the photographing positions distribution information contains multiple vertical positions and multiple horizontal positions respectively corresponding to the multiple photographing position data, the processing circuit is configured to operably derive the multiple vertical positions from the multiple photographing position data, and to operably calculate the multiple horizontal positions according to the site location data, the site orientation data, and the multiple photographing position data.

9. The image sharing system of claim 1, wherein the photographing positions distribution information contains multiple photographing altitudes and multiple photographing azimuths respectively corresponding to the multiple photographing position data, the processing circuit is configured to operably derive the multiple photographing altitudes from the multiple photographing position data, and to operably calculate the multiple photographing azimuths according to the site location data, the site orientation data, and the multiple photographing position data.

10. The image sharing system of claim 9, wherein the processing circuit is further configured to operably perform following operations:
- deriving a target position of the target site from the site location data;
- deriving a site orientation direction of the target site from the site orientation data;
- deriving multiple device positions from the multiple photographing position data;
- configuring the target position as a basis point;
- configuring a vertical plane on which the site orientation direction resides as a basis plane;
- respectively calculating multiple horizontal angles that the multiple device positions rotate clockwise from the basis plane; and
- respectively configuring the multiple horizontal angles as the multiple photographing azimuths.

11. The image sharing system of claim 9, wherein the multiple option objects comprise a first option object, a second option object, and a third option object, the first option object corresponds to a first photographing azimuth of the multiple photographing azimuths and corresponds to a first photographing altitude of the multiple photographing altitudes, the second option object corresponds to a second photographing azimuth of the multiple photographing azimuths and corresponds to a second photographing altitude of the multiple photographing altitudes, the third option object corresponds to a third photographing azimuth of the multiple photographing azimuths and corresponds to a third photographing altitude of the multiple photographing altitudes, the first photographing azimuth is less than the second photographing azimuth, the second photographing azimuth is less than the third photographing azimuth, the third photographing altitude is less than the first photographing altitude, and the first photographing altitude is less than the second photographing altitude;
wherein in the GUI, the control circuit arranges the third option object to have a horizontal position in a left side of the second option object, arranges the first option object to have a horizontal position in a left side of the third option object, configures a vertical position of the first option object to be higher than a vertical position of the third option object, and configures a vertical position of the second option object to be higher than the vertical position of the first option object.

12. The image sharing system of claim 11, wherein the control circuit divides multiple ribbon regions respectively corresponding to multiple reference indicators within the GUI, the multiple reference indicators comprise a first reference indicator, and the multiple ribbon regions comprise a first ribbon region corresponding to the first reference indicator;
wherein if the moving command corresponds to the first ribbon region, the control circuit controls the display device to move multiple option objects within the first ribbon region toward a same side, to correspondingly change a position or content of the first reference indicator, to maintain positions of all option objects within other ribbon regions unchanged, and to maintain positions and contents of other reference indicators unchanged.

13. The image sharing system of claim 12, wherein after the display device moves the multiple option objects within the first ribbon region toward a same side, if a together shift command issued by the user is received by the input device, the control circuit controls the display device to move multiple option objects within different ribbon regions in the multiple ribbon regions toward a same side and to synchronously change positions or contents of the multiple reference indicators.

14. The image sharing system of claim 12, wherein after the display device moves the multiple option objects within the first ribbon region toward a same side, if an align command issued by the user is received by the input device, the control circuit controls the display device to move multiple option objects within at least one ribbon region of the multiple ribbon regions toward a same side and to adjust positions or contents of the multiple reference indicators to be identical or similar with each other.

15. The image sharing system of claim 11, wherein the multiple option objects further comprise a fourth option object and a fifth option object, the fourth option object corresponds to a fourth photographing azimuth of the multiple photographing azimuths and corresponds to a fourth photographing altitude of the multiple photographing altitudes, the fifth option object corresponds to a fifth photographing azimuth of the multiple photographing azimuths and corresponds to a fifth photographing altitude of the multiple photographing altitudes, the fourth photographing azimuth is greater than the third photographing azimuth, the fifth photographing azimuth is equal to the fourth photographing azimuth, the fourth photographing altitude is equal to the first photographing altitude, and the fifth photographing altitude is less than the fourth photographing altitude;

wherein when the display device displays the GUI, if the moving command is received by the input device, the control circuit controls the display device to synchronously move the first option object, the fourth option object, and the fifth option object a same horizontal distance toward a same direction and to maintain vertical positions of the first option object, the fourth option object, and the fifth option object in the GUI unchanged.

16. The image sharing system of claim 15, wherein the control circuit is further configured to operably divide a rectangular area in the GUI into the multiple ribbon regions, to operably define multiple vertical gridlines on the rectangular area, defines multiple horizontal gridlines perpendicular to the multiple vertical gridlines on the rectangular area, and to operably control the display device to align each of the multiple option objects with at least one of the multiple vertical gridlines and the multiple horizontal gridlines.

17. The image sharing system of claim 11, wherein the multiple option objects further comprise a fourth option object and a fifth option object, the fourth option object corresponds to a fourth photographing azimuth of the multiple photographing azimuths and corresponds to a fourth photographing altitude of the multiple photographing altitudes, the fifth option object corresponds to a fifth photographing azimuth of the multiple photographing azimuths and corresponds to a fifth photographing altitude of the multiple photographing altitudes, the fourth photographing azimuth is greater than the third photographing azimuth, the fifth photographing azimuth is equal to the fourth photographing azimuth, the fourth photographing altitude is equal to the first photographing altitude, and the fifth photographing altitude is less than the fourth photographing altitude;

wherein the control circuit is further configured to operably control the display device to show a cylindrical object in the GUI, and to arrange the multiple option objects on a lateral surface of the cylindrical object according to the multiple photographing azimuths and the multiple photographing altitudes, so that the first option object in the GUI has a vertical position higher than a vertical position of the fourth option object, and the fifth option object in the GUI has a same horizontal position with the fourth option object.

18. The image sharing system of claim 17, wherein the control circuit is further configured to operably divide the lateral surface of the cylindrical object into the multiple ribbon regions, to operably define multiple vertical gridlines and multiple annular gridlines perpendicular to the multiple vertical gridlines on the lateral surface of the cylindrical object, and to operably control the display device to align each of the multiple option objects with at least one of the multiple vertical gridlines and the multiple annular gridlines.

19. The image sharing system of claim 11, wherein the multiple option objects further comprise a fourth option object and a fifth option object, the fourth option object corresponds to a fourth photographing azimuth of the multiple photographing azimuths and corresponds to a fourth photographing altitude of the multiple photographing altitudes, the fifth option object corresponds to a fifth photographing azimuth of the multiple photographing azimuths and corresponds to a fifth photographing altitude of the multiple photographing altitudes, the fourth photographing azimuth is greater than the third photographing azimuth, the fifth photographing azimuth is equal to the fourth photographing azimuth, the fourth photographing altitude is equal to the first photographing altitude, and the fifth photographing altitude is less than the fourth photographing altitude;

wherein the control circuit is further configured to operably control the display device to show a spherical object in the GUI, and to arrange the multiple option objects on a spherical surface of the spherical object according to the multiple photographing azimuths and the multiple photographing altitudes, so that the first option object in the GUI has a vertical position higher than a vertical position of the fourth option object, and the fifth option object in the GUI is arranged to have a horizontal position in a left side of the fourth option object.

20. The image sharing system of claim 19, wherein the control circuit is further configured to operably divide the spherical surface of the spherical object into the multiple ribbon regions, to operably define multiple longitude lines and multiple latitude lines perpendicular to the multiple longitude lines on the spherical surface of the spherical object, and to operably control the display device to align each of the multiple option objects with at least one of the multiple longitude lines and the multiple latitude lines.

21. A computer program product, stored in a non-transitory storage device of an image playback device of an image sharing system, when executed by a control circuit of the image playback device, enabling the image playback device to generate a GUI, wherein the image sharing system comprises an image providing server and the image playback device, the image providing server being configured to operably store a site location data and a site orientation data of a target site, multiple image data, and multiple photographing position data respectively corresponding to the multiple image data, to operably calculate a photographing positions distribution information representing a spatial distribution of the multiple photographing position data according to the site location data, the site orientation data, and the multiple photographing position data, and to operably transmit the photographing positions distribution information through Internet after receiving an image enquiry request transmitted from the image playback device, wherein each of the multiple image data is photographed within a predetermined distance from the target site or contains at least a portion of image content of an event occurred at the target site; the image playback device comprises a communication circuit, a display device, an input device, and the control circuit, the computer program product comprising:

a receiving module, for utilizing the communication circuit to receive the photographing positions distribution information transmitted from the image providing server through the Internet;

an option object generating module, for utilizing the control circuit to generate multiple option objects respectively corresponding to the multiple image data;

an arranging module, for utilizing the control circuit to arrange the multiple option objects according to the photographing positions distribution information so as to generate a graphic user interface (GUI) containing the multiple option objects and one or more reference indicators;

a displaying control module, for utilizing the display device to display the GUI; and a transmitting module;

wherein when the display device displays the GUI, if a moving command issued by the user is received by the input device, the displaying control module controls the display device to move at least part of the multiple option objects in the GUI toward a same side and to correspondingly change position or content of at least one of the one or more reference indicators, and if an option object selection command corresponding to a target option object in the GUI is received by the input device, the transmitting module controls the communication circuit to transmit an image data request corresponding to the target option object to the image providing server through the Internet;

wherein when the image data request is received by the image providing server, the image providing server transmits a target image data out of the multiple image data to the communication circuit through the Internet, and when the target image data is received by the communication circuit, the control circuit controls the display device to display the target image data.

22. The computer program product of claim 21, wherein the image providing server further configures multiple characteristic parameter sets respectively corresponding to the multiple image data, and transmits the multiple characteristic parameter sets through the Internet;

wherein the receiving module further utilizes the communication circuit to receive the multiple characteristic parameter sets transmitted from the image providing server, and the option object generating module further utilizes the control circuit to configure one or more visual indicators for each of the multiple option objects according to the multiple characteristic parameter sets.

23. The computer program product of claim 22, wherein the option object generating module utilizes the control circuit to configure at least one of following visual indicators for the target option object according to a target characteristic parameter set out of the multiple characteristic parameter sets:

a size of the target option object;

a color of the target option object;

a shape of the target option object;

an outer frame color of the target option object; and an outer frame thickness of the target option object.

24. The computer program product of claim 23, wherein the one or more visual indicators of the target option object are utilized for representing at least one of following parameters of the target image data:

a statistic data of the target image data;

an identity type of a provider of the target image data;

an aspect ratio of the target image data;

a resolution of the target image data; and an image type of the target image data;

wherein the statistic data corresponds to a ranking score of the target image data or an annotation count of the target image data.

25. The computer program product of claim 21, wherein the image providing server is further configured to operably generate multiple thumbnails respectively corresponding to the multiple image data, and to operably transmit the multiple thumbnails through the Internet;

wherein the receiving module further utilizes the communication circuit to receive the multiple thumbnails transmitted from the image providing server, and the option object generating module further controls the control circuit to respectively utilize the multiple thumbnails to be main parts of the multiple option objects.

26. The computer program product of claim 21, wherein the option object generating module further utilizes the control circuit to configure each of the main parts of the multiple option objects to be shaped as a predetermined geometrical graph.

27. The computer program product of claim 21, wherein the photographing positions distribution information contains multiple vertical positions and multiple horizontal positions respectively corresponding to the multiple photographing position data, the image providing server is configured to operably derive the multiple vertical positions from the multiple photographing position data, and to operably calculate the multiple horizontal positions according to the site location data, the site orientation data, and the multiple photographing position data.

28. The computer program product of claim 21, wherein the photographing positions distribution information contains multiple photographing altitudes and multiple photographing azimuths respectively corresponding to the multiple photographing position data, the image providing server is configured to operably derive the multiple photographing altitudes from the multiple photographing position data, and to operably calculate the multiple photographing azimuths according to the site location data, the site orientation data, and the multiple photographing position data.

29. The computer program product of claim 28, wherein the multiple option objects comprise a first option object, a second option object, and a third option object, the first option object corresponds to a first photographing azimuth of the multiple photographing azimuths and corresponds to a first photographing altitude of the multiple photographing altitudes, the second option object corresponds to a second photographing azimuth of the multiple photographing azimuths and corresponds to a second photographing altitude of the multiple photographing altitudes, the third option object corresponds to a third photographing azimuth of the multiple photographing azimuths and corresponds to a third photographing altitude of the multiple photographing altitudes, the first photographing azimuth is less than the second photographing azimuth, the second photographing azimuth is less than the third photographing azimuth, the third photographing altitude is less than the first photographing altitude, and the first photographing altitude is less than the second photographing altitude;

wherein in the GUI, the arranging module arranges the third option object to have a horizontal position in a left side of the second option object, arranges the first option object to have a horizontal position in a left side of the third option object, configures a vertical position of the first option object to be higher than a vertical position of the third option object, and configures a vertical position of the second option object to be higher than the vertical position of the first option object.

30. The computer program product of claim 29, wherein the arranging module divides multiple ribbon regions respectively corresponding to multiple reference indicators within the GUI, the multiple reference indicators comprise a first reference indicator, and the multiple ribbon regions comprise a first ribbon region corresponding to the first reference indicator;

wherein if the moving command corresponds to the first ribbon region, the displaying control module controls the display device to move multiple option objects within the first ribbon region toward a same side, to correspondingly change a position or content of the first reference indicator, to maintain positions of all option objects within other ribbon regions unchanged, and to maintain positions and contents of other reference indicators unchanged.

31. The computer program product of claim 30, wherein after the display device moves the multiple option objects within the first ribbon region toward a same side, if a together shift command issued by the user is received by the input device, the displaying control module controls the display device to move multiple option objects within different ribbon regions in the multiple ribbon regions toward a same side and to synchronously change positions or contents of the multiple reference indicators.

32. The computer program product of claim 30, wherein after the displaying control module controls the display device to move the multiple option objects within the first ribbon region toward a same side, if an align command issued by the user is received by the input device, the displaying control module controls the display device to move multiple option objects within at least one ribbon region of the multiple ribbon regions toward a same side and to adjust positions or contents of the multiple reference indicators to be identical or similar with each other.

33. The computer program product of claim 29, wherein the multiple option objects further comprise a fourth option object and a fifth option object, the fourth option object corresponds to a fourth photographing azimuth of the multiple photographing azimuths and corresponds to a fourth photographing altitude of the multiple photographing altitudes, the fifth option object corresponds to a fifth photographing azimuth of the multiple photographing azimuths and corresponds to a fifth photographing altitude of the multiple photographing altitudes, the fourth photographing azimuth is greater than the third photographing azimuth, the fifth photographing azimuth is equal to the fourth photographing azimuth, the fourth photographing altitude is equal to the first photographing altitude, and the fifth photographing altitude is less than the fourth photographing altitude;

wherein when the display device displays the GUI, if the moving command is received by the input device, the displaying control module controls the display device to synchronously move the first option object, the fourth option object, and the fifth option object a same horizontal distance toward a same direction and to maintain vertical positions of the first option object, the fourth option object, and the fifth option object in the GUI unchanged.

34. The computer program product of claim 33, wherein the displaying control module further divides a rectangular area in the GUI into the multiple ribbon regions, defines multiple vertical gridlines on the rectangular area, defines multiple horizontal gridlines perpendicular to the multiple vertical gridlines on the rectangular area, and controls the display device to align each of the multiple option objects with at least one of the multiple vertical gridlines and the multiple horizontal gridlines.

35. The computer program product of claim 29, wherein the multiple option objects further comprise a fourth option object and a fifth option object, the fourth option object corresponds to a fourth photographing azimuth of the multiple photographing azimuths and corresponds to a fourth photographing altitude of the multiple photographing altitudes, the fifth option object corresponds to a fifth photographing azimuth of the multiple photographing azimuths and corresponds to a fifth photographing altitude of the multiple photographing altitudes, the fourth photographing azimuth is greater than the third photographing azimuth, the fifth photographing azimuth is equal to the fourth photographing azimuth, the fourth photographing altitude is equal to the first photographing altitude, and the fifth photographing altitude is less than the fourth photographing altitude;

wherein the arranging module further presents a cylindrical object in the GUI and arranges the multiple option objects on a lateral surface of the cylindrical object according to the multiple photographing azimuths and the multiple photographing altitudes, so that the first option object in the GUI has a vertical position higher than a vertical position of the fourth option object, and the fifth option object in the GUI has a same horizontal position with the fourth option object.

36. The computer program product of claim 35, wherein the displaying control module further divides the lateral surface of the cylindrical object into the multiple ribbon regions, to operably define multiple vertical gridlines and multiple annular gridlines perpendicular to the multiple vertical gridlines on the lateral surface of the cylindrical object, and controls the display device to align each of the multiple option objects with at least one of the multiple vertical gridlines and the multiple annular gridlines.

37. The computer program product of claim 29, wherein the multiple option objects further comprise a fourth option object and a fifth option object, the fourth option object corresponds to a fourth photographing azimuth of the multiple photographing azimuths and corresponds to a fourth photographing altitude of the multiple photographing altitudes, the fifth option object corresponds to a fifth photographing azimuth of the multiple photographing azimuths and corresponds to a fifth photographing altitude of the multiple photographing altitudes, the fourth photographing azimuth is greater than the third photographing azimuth, the fifth photographing azimuth is equal to the fourth photographing azimuth, the fourth photographing altitude is equal to the first photographing altitude, and the fifth photographing altitude is less than the fourth photographing altitude;

wherein the arranging module further presents a spherical object in the GUI and arranges the multiple option objects on a spherical surface of the spherical object according to the multiple photographing azimuths and the multiple photographing altitudes, so that the first option object in the GUI has a vertical position higher than a vertical position of the fourth option object, and the fifth option object in the GUI is arranged to have a horizontal position in a left side of the fourth option object.

38. The computer program product of claim 37, wherein the displaying control module further divides the spherical surface of the spherical object into the multiple ribbon regions, defines multiple longitude lines and multiple latitude lines perpendicular to the multiple longitude lines on the spherical surface of the spherical object, and controls the display device to align each of the multiple option objects with at least one of the multiple longitude lines and the multiple latitude lines.

* * * * *